(12) United States Patent
Ichikawa et al.

(10) Patent No.: US 8,476,789 B2
(45) Date of Patent: Jul. 2, 2013

(54) POWER TRANSMITTING APPARATUS, POWER RECEIVING APPARATUS, AND POWER TRANSMISSION SYSTEM

(75) Inventors: Keiichi Ichikawa, Kyoto-fu (JP); Shinji Goma, Kyoto-fu (JP); Kazuya Kato, Kyoto-fu (JP)

(73) Assignee: Murata Manufacturing Co., Ltd. (JP)

( * ) Notice: Subject to any disclaimer, the term of this patent is extended or adjusted under 35 U.S.C. 154(b) by 225 days.

(21) Appl. No.: 13/192,263

(22) Filed: Jul. 27, 2011

(65) Prior Publication Data
US 2012/0025628 A1 Feb. 2, 2012

(30) Foreign Application Priority Data

Jul. 28, 2010 (JP) ................................ 2010-169386
Jan. 13, 2011 (JP) ................................ 2011-004782

(51) Int. Cl.
*H01F 27/42* (2006.01)
(52) U.S. Cl.
USPC .......................................... 307/104; 307/147
(58) Field of Classification Search
USPC ................................................. 307/104, 147
See application file for complete search history.

(56) References Cited

U.S. PATENT DOCUMENTS

| | | |
|---|---|---|
| 6,173,899 B1 | 1/2001 | Rozin |
| 8,242,638 B2 | 8/2012 | Camurati et al. |
| 2009/0206675 A1 | 8/2009 | Camurati et al. |
| 2009/0302690 A1 | 12/2009 | Kubobo et al. |
| 2012/0262005 A1 | 10/2012 | Camurati et al. |
| 2012/0267959 A1 | 10/2012 | Camurati et al. |
| 2012/0267963 A1 | 10/2012 | Camurati et al. |

FOREIGN PATENT DOCUMENTS

| | | |
|---|---|---|
| CN | 101416411 A | 4/2009 |
| JP | 58-057245 U | 4/1983 |
| JP | 04-317516 A | 11/1992 |
| JP | 04-317517 A | 11/1992 |
| JP | 05-038232 U | 5/1993 |
| JP | 09-128110 A | 5/1997 |
| JP | 2004-501593 A | 1/2004 |
| JP | 2007-213933 A | 8/2007 |
| JP | 2008-234523 A | 10/2008 |
| JP | 2009-089520 A | 4/2009 |
| JP | 2009-531009 A | 8/2009 |
| JP | 2009-296857 A | 12/2009 |
| JP | 2010-183706 A | 8/2010 |
| WO | 2010/017416 A1 | 2/2010 |

OTHER PUBLICATIONS

The First Office Action issued by the State Intellectual Property Office of People's Republic of China on Feb. 27, 2013, which corresponds to Chinese patent Application No. 201110202248.2 and is related to U.S. Appl. No. 13/192,263 with translation.
The European Search Report dated Apr. 9, 2013, which corresponds to EP Application No. 11175205.1 and is related to U.S. Appl. No. 13/192,263.

*Primary Examiner* — Robert L. Deberadinis
(74) *Attorney, Agent, or Firm* — Studebaker & Brackett PC

(57) ABSTRACT

A power transmitting apparatus has a power transmitting apparatus side active electrode provided within the casing thereof along a seat. A power transmitting apparatus side passive electrode is exposed on a backrest. A power receiving apparatus has a power receiving apparatus side active electrode formed along the bottom surface thereof. A power receiving apparatus side passive electrode is formed on the outer surface of the casing of the power receiving apparatus. By mounting the power receiving apparatus on a mounting portion of the power transmitting apparatus, the power receiving apparatus side active electrode faces the power transmitting apparatus side active electrode with a dielectric layer therebetween, and the power receiving apparatus side passive electrode is directly electrically connected to the power transmitting apparatus side passive electrode.

23 Claims, 21 Drawing Sheets

PRIOR ART

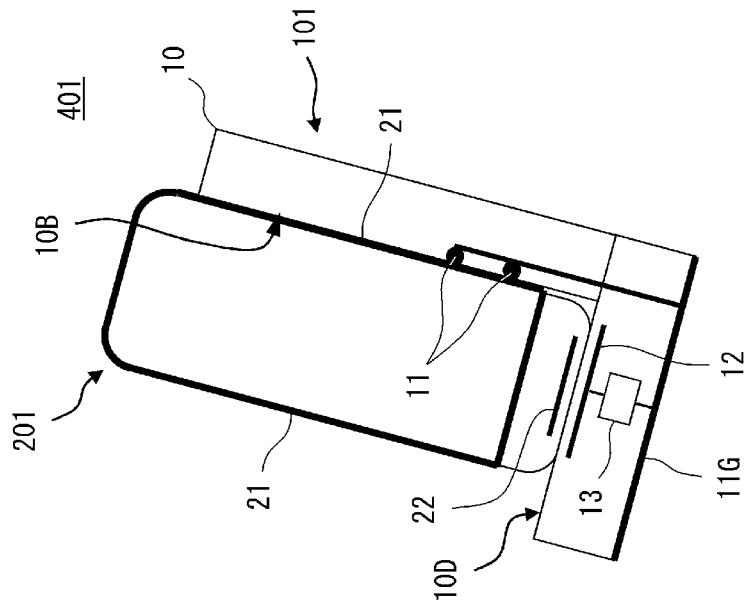
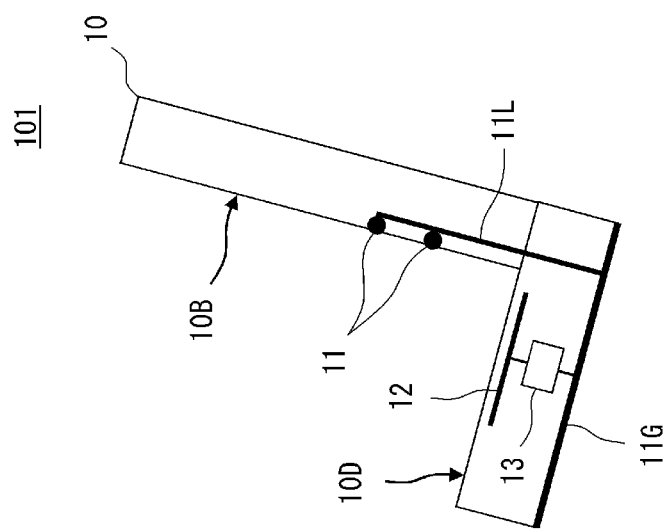

(A)

(B)

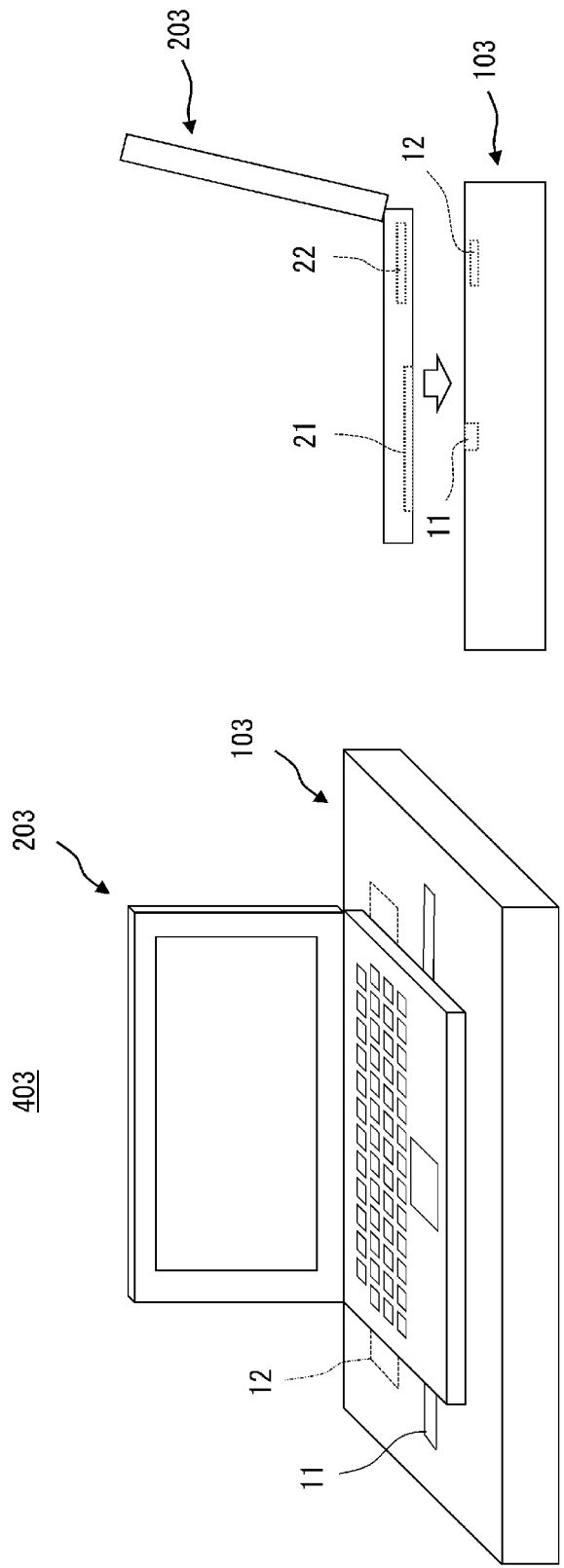

(A)

(B)

(A)

(B)

(A)

(B)

POWER TRANSMITTING APPARATUS, POWER RECEIVING APPARATUS, AND POWER TRANSMISSION SYSTEM

CROSS REFERENCE TO RELATED APPLICATIONS

The present application claims priority to Japanese Patent Application No. 2010-169386 filed Jul. 28, 2010, and Japanese Patent Application No. 2010-004782 filed Jan. 13, 2011, the entire contents of each of these applications being incorporated herein by reference in their entirety.

FIELD OF THE INVENTION

The present disclosure relates to power transmitting apparatuses, power receiving apparatuses, and power transmission systems.

BACKGROUND

Examples of typical known systems for transmitting power between apparatuses arranged close to each other include magnetic-field-coupling power transmission systems in which power is transmitted from the primary coil of a power transmitting apparatus to the secondary coil of a power receiving apparatus using a magnetic field. However, when power is transmitted using magnetic coupling, since electromotive force is strongly influenced by the magnitude of magnetic flux passing through each coil, high accuracy is required in the relative positional relationship between the primary coil and the secondary coil. In addition, since coils are used, it is difficult to reduce the sizes of the apparatuses.

On the other hand, electric-field-coupling wireless power transmission systems are known, as disclosed in Japanese Unexamined Patent Application Publication (Translation of PCT Application) No. 2009-531009 and Japanese Unexamined Patent Application Publication No. 2009-296857. In these systems, power is transmitted from the coupling electrode of a power transmitting apparatus to the coupling electrode of a power receiving apparatus through an electric field. This method allows the accuracy of the relative positional relationship between the coupling electrodes to be relatively low and allows the sizes and thicknesses of the coupling electrodes to be reduced.

FIG. 1 illustrates the basic configuration of the power transmission system disclosed in Japanese Unexamined Patent Application Publication (Translation of PCT Application) No. 2009-531009. This power transmission system includes a power transmitting apparatus and a power receiving apparatus. The power transmitting apparatus includes a high-frequency high-voltage generator circuit 1, a passive electrode 2, and an active electrode 3. The power receiving apparatus includes a high-frequency high-voltage load circuit 5, a passive electrode 7, and an active electrode 6. As a result of the active electrode 3 and the active electrode 6 being arranged to be close to each other with a gap 4 therebetween, these two electrodes are coupled to each other through an electric field.

In the power transmission system disclosed in Japanese Unexamined Patent Application Publication No. 2009-296857, a power transmitting apparatus includes a first resonant circuit that resonates with an AC signal generated by an AC signal generator and a power feeding electrode. A power receiving apparatus includes a power receiving electrode that generates an electric signal, a second resonant circuit that resonates with the electric signal, a rectifier that generates a DC power from the electric signal with which the second resonance circuit is resonating, and a circuit load. The active electrode and passive electrode of the power transmitting apparatus are arranged in the same plane, and the active electrode and passive electrode of the power receiving apparatus are arranged so as to face the corresponding electrodes of the power transmitting apparatus with a predetermined separation therebetween.

In the power transmission system disclosed in Japanese Unexamined Patent Application Publication (Translation of PCT Application) No. 2009-531009, the active electrodes of the power transmitting apparatus and the power receiving apparatus are made to be close to each other, thereby forming a strong electric field between the electrodes, and the capacitance generated between the passive electrodes of the power transmitting apparatus and the power receiving apparatus is made to be as high as possible. Hence the sizes of the passive electrodes need to be increased. When the passive electrode of the power transmitting unit, the active electrode of the power transmitting unit, the active electrode of the power receiving unit, and the passive electrode of the power receiving unit are arranged in a vertical direction in a narrow vertically-long space, stray capacitance is likely to become excessively high. Also in the power transmission system disclosed in Japanese Unexamined Patent Application Publication No. 2009-296857, since the active electrode and passive electrode are arranged adjacent to each other in a plane, stray capacitance generated between the active or passive electrode and a circuit substrate arranged close to the electrode is likely to become excessively high. Hence, in both of the cases, coupling is not strong and transmission efficiency is low.

Both in Japanese Unexamined Patent Application Publication (Translation of PCT Application) No. 2009-531009 and in Japanese Unexamined Patent Application Publication No. 2009-296857, capacitance between the passive electrodes of a power transmitting apparatus and a power receiving apparatus cannot be made to be sufficiently large due to these structures, and the smaller this capacitance between the passive electrodes, the larger the fluctuations in the potentials of the two passive electrodes. The fluctuations in the potentials of the passive electrodes of the power transmitting apparatus and the power receiving apparatus may cause leakage of an undesirable electromagnetic field or fluctuations in the ground potentials of the power transmitting apparatus and the power receiving apparatus.

SUMMARY

In an embodiment of the present disclosure, a power transmitting apparatus, a power receiving apparatus, and a power transmission system are capable of realizing high power transmission efficiency between the power transmitting apparatus and the power receiving apparatus with limited fluctuations in the potentials of the passive electrodes.

More specific exemplary embodiments are as follows.

(1) A power receiving apparatus according to preferred embodiments of the present disclosure is a power receiving apparatus forming a pair with a power transmitting apparatus in which a high-frequency high-voltage generator circuit that applies a high-frequency high voltage is connected between a power transmitting apparatus side active electrode and a power transmitting apparatus side passive electrode, the power receiving apparatus including: a power receiving apparatus side active electrode; a power receiving apparatus side passive electrode; a voltage step-down circuit that decreases a voltage generated between the power receiving apparatus side active electrode and the power receiving apparatus side passive electrode; and a load circuit that receives an output voltage of the voltage step-down circuit as a power supply voltage. The power receiving apparatus side active electrode is connected to the power transmitting apparatus side active electrode through capacitance, and the power receiving apparatus side passive electrode is directly electrically connected to the power transmitting apparatus side passive electrode.

In this structure, since the passive electrodes of the power transmitting apparatus and the power receiving apparatus are directly electrically connected to each other, the power receiving apparatus side passive electrode has approximately the same potential as the power transmitting apparatus side passive electrode. Hence, the potential of the power receiving apparatus side passive electrode is stabilized, whereby a power transmission system with reduced undesirable leakage of an electromagnetic field and fluctuations in the ground potential is realized while strict accuracy in the positional relationship between the power transmitting apparatus and the power receiving apparatus is not required. Further, since stray capacitance is suppressed, a decrease in the degree of coupling is limited, and high efficiency is obtained.

In addition, since power is transmitted using a stepped-up high voltage, a current flowing through the power transmitting apparatus side passive electrode may be on the order of, for example, several milliamperes (for example, a current much smaller than a charging current). Hence, there is no need to make the contact resistance of the power receiving apparatus side electrode small, allowing various contact means such as conductive rubber to be used.

(2) The power receiving apparatus side passive electrode, for example, forms a casing of the power receiving apparatus. This structure allows the power receiving apparatus side passive electrode to easily and reliably contact the power transmitting apparatus side passive electrode.

(3) A power receiving apparatus according to preferred embodiments of the present disclosure is a power receiving apparatus forming a pair with a power transmitting apparatus in which a high-frequency high-voltage generator circuit that applies a high-frequency high voltage is connected between a power transmitting apparatus side active electrode and a power transmitting apparatus side passive electrode. The power transmitting apparatus includes: the mounting surface formed of a first surface and a second surface substantially perpendicular to each other; the power transmitting apparatus side active electrode provided along the first surface; the power transmitting apparatus side passive electrode provided on the second surface; and a high-frequency high-voltage generator circuit that applies a high-frequency high voltage between the power transmitting apparatus side active electrode and the power transmitting apparatus side passive electrode.

The power receiving apparatus forming a pair with the power transmitting apparatus includes: a casing having a bottom surface and a back surface substantially perpendicular to each other, and two substantially parallel side surfaces substantially perpendicular to the bottom surface and the back surface; a power receiving apparatus side active electrode that is provided along the back surface of the casing and that faces the power transmitting apparatus side active electrode; a power receiving apparatus side passive electrode that is provided on the bottom surface and at least one of the two side surfaces and that is directly electrically connected to the power transmitting apparatus side passive electrode; a voltage step-down circuit that decreases a voltage generated between the power receiving apparatus side active electrode and the power receiving apparatus side passive electrode; and a load circuit that receives an output voltage of the voltage step-down circuit as a power supply voltage.

With this structure, the potential of the power receiving apparatus side passive electrode is stabilized, whereby a power transmission system with reduced undesirable leakage of an electromagnetic field and fluctuation in the potential is realized while strict accuracy in the positional relationship between the power transmitting apparatus and the power receiving apparatus is not required. In addition, since the passive electrode which is directly electrically connected to the power transmitting apparatus side passive electrode is provided on the bottom surface and at least one of the two side surfaces of the casing, power can be transmitted from the power transmitting apparatus to the power receiving apparatus irrespective of which surface is mounted on the power transmitting apparatus, whereby flexibility in mounting the power receiving apparatus is increased.

(4) A power receiving apparatus according to preferred embodiments of the present disclosure is a power receiving apparatus forming a pair with a power transmitting apparatus in which a high-frequency high-voltage generator circuit that applies a high-frequency high voltage is connected between a power transmitting apparatus side active electrode and a power transmitting apparatus side passive electrode. The power transmitting apparatus includes a mounting surface formed of a first surface and a second surface substantially perpendicular to each other. In the power transmitting apparatus, a high-frequency high-voltage generator circuit that applies a high-frequency high voltage is connected between the power transmitting apparatus side active electrode provided along the second surface and the power transmitting apparatus side passive electrode provided at a portion at which the first and second surfaces intersect.

The power receiving apparatus forming a pair with the power transmitting apparatus includes: a casing having a bottom surface and a back surface substantially perpendicular to each other, and two substantially parallel side surfaces substantially perpendicular to the bottom surface and the back surface; power receiving apparatus side active electrodes that are respectively provided along the back surface and the two side surfaces of the casing and that face the power transmitting apparatus side active electrode; a power receiving apparatus side passive electrode that is provided at a portion at which the back surface and the bottom surface intersect and at portions at which the two side surfaces and the back surface intersect and that is directly electrically connected to the power transmitting apparatus side passive electrode; a voltage step-down circuit that decreases a voltage generated between the power receiving apparatus side active electrode and the power receiving apparatus side passive electrode; and a load circuit that receives an output voltage of the voltage step-down circuit as a power supply voltage.

With this structure, the potential of the power receiving apparatus side passive electrode is stabilized, whereby a power transmission system with reduced undesirable leakage of an electromagnetic field and fluctuation in the potential is realized while strict accuracy in the positional relationship between the power transmitting apparatus and the power receiving apparatus is not required.

Further, in the power transmitting apparatus, the passive electrode is provided at a portion at which the first and second surfaces intersect, and the power receiving apparatus side passive electrode that is directly electrically connected to the passive electrode of the power transmitting apparatus is provided at a portion at which the back surface and the bottom surface intersect and at portions at which the two side surfaces and the back surface intersect. Thereby, irrespective of which one among the bottom surface and the two side surfaces is mounted on the power transmitting apparatus, the active electrodes face each other, and the passive electrodes are directly electrically connected to each other. Hence, power can be transmitted from the power transmitting apparatus to the power receiving apparatus, and flexibility in mounting the power receiving apparatus is increased.

(5) A power transmitting apparatus according to preferred embodiments of the present disclosure is a power transmitting apparatus forming a pair with a power receiving apparatus in which a voltage step-down circuit is connected between a power receiving apparatus side active electrode and a power receiving apparatus side passive electrode, the power transmitting apparatus including: a power transmitting apparatus side active electrode that faces the power receiving apparatus side active electrode; a power transmitting apparatus side passive electrode that faces the power receiving apparatus side passive electrode; and a high-frequency high-voltage generator circuit connected between the power transmitting apparatus side active electrode and the power transmitting apparatus side passive electrode. The power transmitting apparatus side active electrode is connected to the power receiving apparatus side active electrode through capacitance, and the power transmitting side active electrode is directly electrically connected to the power receiving apparatus side passive electrode.

In this structure, since the passive electrodes of the power transmitting apparatus and the power receiving apparatus are directly electrically connected to each other, the power receiving apparatus side passive electrode has approximately the same potential as the power transmitting apparatus side passive electrode. Hence, the potential of the power receiving apparatus side passive electrode is stabilized, whereby a power transmission system with reduced undesirable leakage of an electromagnetic field and fluctuation in the potential is realized while strict accuracy in the positional relationship between the power transmitting apparatus and the power receiving apparatus is not required. Further, since stray capacitance is suppressed, the degree of coupling is limited, and high efficiency is obtained.

(6) The the power transmitting apparatus side passive electrode is, for example, connected to a ground of the power transmitting apparatus. This structure allows the potential of the power transmitting apparatus side passive electrode to be further stabilized.

(7) The ground of the power transmitting apparatus may be connected to a reference potential of an input power supply system of the power transmitting apparatus through a low impedance for a direct current or an alternating current. This structure allows fluctuations in the ground potentials of the power transmitting apparatus and the power receiving apparatus to be suppressed.

(8) A power transmission system according to preferred embodiments of the present disclosure includes the power transmitting apparatus and the power receiving apparatus. The power transmitting apparatus includes a mounting surface formed of first and second surfaces substantially perpendicular to each other. The power receiving apparatus includes a third surface in contact with the first surface of the power transmitting apparatus and a fourth surface in contact with the second surface of the power transmitting apparatus. The power transmitting apparatus side passive electrode is provided on the first surface, and the power transmitting apparatus side active electrode is provided along the second surface. The power receiving apparatus side passive electrode is provided on the third surface, and the power receiving apparatus side active electrode is provided along the fourth surface.

With this structure, the passive electrodes of the power transmitting apparatus and the power receiving apparatus can be made to be in stable contact with each other, and the active electrodes of the power transmitting apparatus and the power receiving apparatus can be made to face each other with high accuracy, only by mounting the power receiving apparatus on a mounting surface provided in the power transmitting apparatus. Further, since the active electrodes of the power transmitting apparatus and the power receiving apparatus are arranged along the mounting surface, leakage of an electric field from the two active electrodes is reduced.

(9) In the power transmission system according to preferred embodiments of the present disclosure, the power receiving apparatus preferably further includes fifth and sixth substantially parallel surfaces substantially perpendicular to the third and fourth surfaces, and the power receiving apparatus side passive electrode is preferably also provided on at least one of the fifth and sixth surfaces.

In this structure, irrespective of which surface among the fourth to sixth surfaces is mounted on the power transmitting apparatus, the active electrodes face each other, and the passive electrodes are directly electrically connected to each other. Hence, power can be transmitted from the power transmitting apparatus to the power receiving apparatus, and flexibility in the manner in which the power receiving apparatus is mounted is increased.

(10) A power transmission system according to preferred embodiments of the present disclosure includes the power transmitting apparatus and the power receiving apparatus. The power receiving apparatus includes a mounting surface for mounting the power receiving apparatus. The power transmitting apparatus side passive electrode is provided on the mounting surface of the power transmitting apparatus, and the power transmitting apparatus side active electrode is provided along the mounting surface. The power receiving apparatus side passive electrode is provided on the bottom surface of the power receiving apparatus and the power receiving apparatus side active electrode is provided along the bottom surface of the power receiving apparatus.

With this structure, since the weight of the power receiving apparatus makes the power receiving apparatus side passive electrode is stably in contact with the power transmitting apparatus side passive electrode, the power transmitting apparatus side passive electrode and/or the power receiving apparatus side passive electrode can be made to be small in area.

(11) In the power transmission system according to preferred embodiments of the present disclosure, the power transmitting apparatus side passive electrode is preferably electrically connected to the power receiving apparatus side passive electrode at a plurality of portions, and the power transmitting apparatus preferably includes a detecting unit that detects, via the power receiving apparatus side passive electrode, whether or not there is electrical connection between the power receiving apparatus side passive electrode and the power transmitting apparatus side passive electrode. In this configuration, it is reliably determined whether or not the power receiving apparatus is mounted on the power transmitting apparatus.

(12) In the power transmission system according to preferred embodiments of the present embodiments, preferably, the power transmitting apparatus side passive electrode or the power receiving apparatus side passive electrode is formed of two electrodes provided so as to be separated from each other, and the detecting unit detects whether or not the two electrodes are electrically connected.

With this configuration, since the passive electrode is formed of two electrodes provided so as to be separated from each other, by detecting whether or not the two electrodes are electrically connected, it can be determined whether or not the power transmitting apparatus side passive electrode is in contact with the power receiving apparatus side passive electrode. As a result, it is easily and reliably determined whether or not the power receiving apparatus is mounted on the power transmitting apparatus.

(13) In the power transmission system according to preferred embodiments of the present embodiments, preferably, the two electrodes are substantially shaped like strips and are arranged substantially in parallel with each other along a longitudinal direction.

With this configuration, since the passive electrode is formed by arranging two electrodes in parallel along the longitudinal direction, the passive electrode can be provided even when the mounting surface or the bottom surface of the power receiving apparatus is narrow in the width direction (direction perpendicular to the longitudinal direction). Further, even when the power receiving apparatus is mounted on the power transmitting apparatus so as to be displaced off-center in the longitudinal direction, mounting of the power receiving apparatus is reliably detected.

(14) In the power transmission system according to preferred embodiments of the present embodiments, preferably, the two electrodes are substantially shaped like strips and are arranged in a substantially straight line so as to have the same longitudinal direction.

With this configuration, by arranging the two electrodes in a substantially straight line along the longitudinal direction, mounting of the power receiving apparatus is reliably detected even when the power receiving apparatus is mounted on the power transmitting apparatus so as to be displaced off-center in the width direction.

(15) In the power transmission system according to preferred embodiments of the present embodiments, preferably, the two electrodes are first and second substantially comb-shaped electrodes arranged such that respective electrode fingers of the first and second substantially comb-shaped electrodes are alternately arranged parallel to one another.

With this configuration, by making the passive electrode be two substantially comb-shaped electrodes, the area for electrical conduction between the passive electrodes can be made larger.

(16) A power transmission system according to preferred embodiments of the present disclosure includes: a power transmitting apparatus including: a power transmitting apparatus side active electrode, a power transmitting apparatus side passive electrode, and a high-frequency high-voltage generator circuit connected between the power transmitting apparatus side active electrode and the power transmitting apparatus side passive electrode; and a power receiving apparatus including: power receiving apparatus side active electrodes, a power receiving apparatus side passive electrode, a voltage step-down circuit that decreases a voltage generated between the power receiving apparatus side active electrodes and the power receiving apparatus side passive electrode, and a load circuit that receives an output voltage of the voltage step-down circuit as a power supply voltage.

The power transmitting apparatus side active electrode is connected to the power receiving apparatus side active electrodes through capacitance generated between the power receiving apparatus side active electrodes and the power transmitting apparatus side active electrode, and the power transmitting apparatus side passive electrode is directly electrically connected to the power receiving apparatus side passive electrode.

The power transmitting apparatus includes a mounting surface formed of first and second surfaces substantially perpendicular to each other. The power receiving apparatus includes a casing having third and fourth surfaces perpendicular to each other and substantially parallel fifth and sixth surfaces substantially perpendicular to the third and fourth surfaces.

The power receiving apparatus side passive electrode is provided at a portion at which the first and second surfaces intersect, and the power transmitting apparatus side active electrode is provided along the second surface. The power receiving apparatus side passive electrode is provided at portions at which the third and fourth surfaces intersect, the third and fifth surfaces intersect, and the third and sixth surfaces intersect, and the power receiving apparatus side active electrodes are respectively provided along the fourth to sixth surfaces.

In this configuration, irrespective of which surface among the fourth to sixth surfaces is mounted on the power transmitting apparatus, the active electrodes face each other, and the passive electrodes are directly electrically connected to each other. Hence, power can be transmitted from the power transmitting apparatus to the power receiving apparatus, and flexibility in the manner in which the power receiving apparatus is mounted is increased.

(17) In the power transmission system according to preferred embodiments of the present disclosure, the power receiving apparatus preferably includes: a detecting unit that detects a surface on which the power receiving apparatus side active electrode facing the power transmitting apparatus side active electrode is provided, among the fourth to sixth surfaces; a switch that connects one of the power receiving apparatus side active electrodes provided on the fourth to sixth surfaces to the voltage step-down circuit; and means for connecting the power receiving apparatus side active electrode facing the power transmitting apparatus side active electrode to the voltage step-down circuit by switching the switch.

In this configuration, a voltage is only applied between a necessary active electrode and the passive electrode, and is not applied to other unnecessary active electrodes, and hence, a high potential is not applied, whereby undesirable radiation noise is decreased.

(18) Preferably, the power receiving apparatus side active electrode has a larger area then the power transmitting apparatus side active electrode. As a result of this structure, leakage of an electric field from the power transmitting apparatus side active electrode is further reduced.

(19) In the power transmission system according to preferred embodiments of the present disclosure, the power transmitting apparatus side passive electrode is preferably connected to ground of the power transmitting apparatus. As a result of this configuration, the power receiving apparatus side electrode has the same potential as the ground of the power transmitting apparatus, whereby the potential of the power receiving apparatus side passive electrode is stabilized and leakage of an undesirable electromagnetic field is suppressed.

(20) In the power transmission system according to preferred embodiments of the present disclosure, preferably, the power transmitting apparatus includes a power transmitting apparatus side communication electrode on a surface on which the power transmitting apparatus side passive electrode is formed, and the power receiving apparatus includes a power receiving apparatus side communication electrode in contact with the power transmitting apparatus side communication electrode on a surface on which the power receiving apparatus side passive electrode is formed. As a result of this configuration, data communication can be performed between the power transmitting apparatus and the power receiving apparatus during power transmission.

Since the power receiving apparatus side passive electrode has approximately the same potential as the power transmitting apparatus side passive electrode, the potential of the power receiving apparatus side passive electrode is stabilized, whereby a power transmission system with reduced undesirable leakage of an electromagnetic field and fluctuation in the ground potential is realized while strict accuracy in the positional relationship between the power transmitting apparatus and the power receiving apparatus is not required. Further, since stray capacitance is suppressed, a decrease in the degree of coupling is limited, and high efficiency is obtained.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 3A is a side view of a power transmitting apparatus;

FIG. 3B is a side view of the power transmission system;

FIG. 9A is a perspective view of a power transmission system according to a third exemplary embodiment;

FIG. 9B is a side view illustrating a state immediately before a power receiving apparatus is mounted on a power transmitting apparatus;

DETAILED DESCRIPTION

A first exemplary embodiment will now be described with reference to the drawings.

Figure 1:
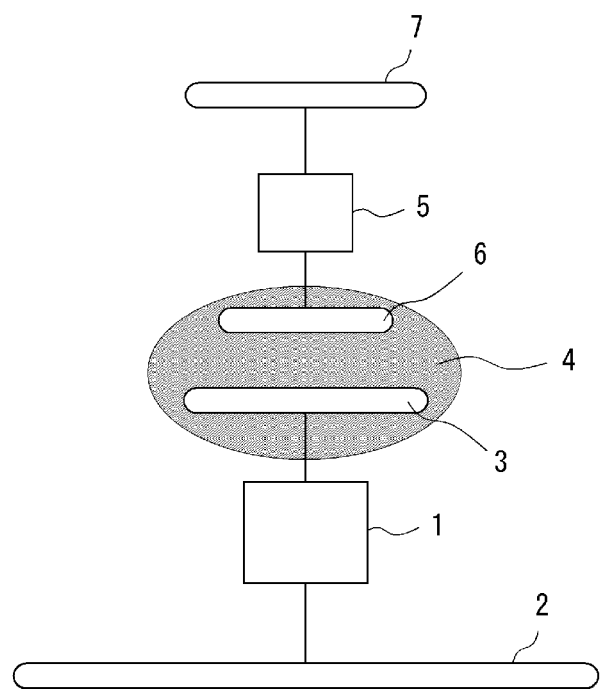
FIG. 1 illustrates the basic configuration of the power transmission system disclosed in Japanese Unexamined Patent Application Publication (Translation of PCT Application) No. 2009-531009.
Figure 2:
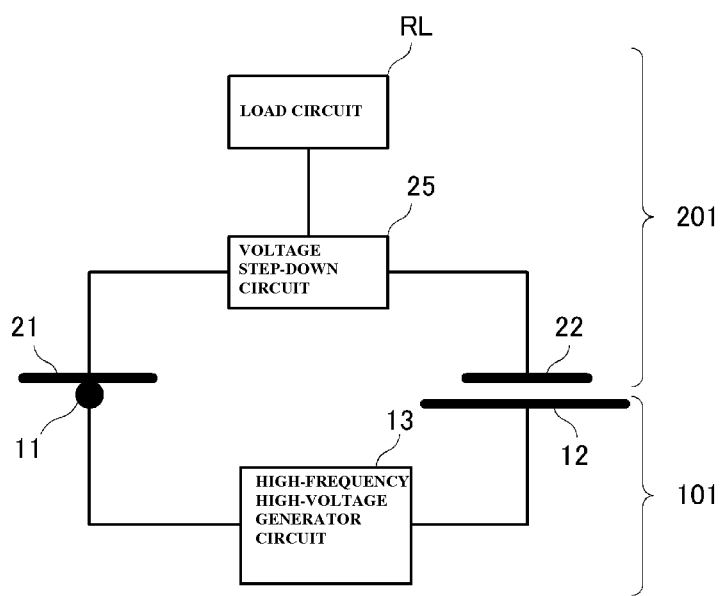
FIG. 2 is a simplified circuit diagram of a power transmission system according to a first exemplary embodiment.

FIG. 2 is a simplified circuit diagram of a power transmission system 401 according to a first exemplary embodiment. The power transmission system 401 is formed of a power transmitting apparatus 101 and a power receiving apparatus 201. The power transmitting apparatus 101 includes a power transmitting apparatus side passive electrode 11 and a power transmitting apparatus side active electrode 12, and the power receiving apparatus 201 includes a power receiving apparatus side passive electrode 21 and a power receiving apparatus side active electrode 22.

A high-frequency high-voltage generator circuit 13 is connected between the power transmitting apparatus side active electrode 12 and the power transmitting apparatus side passive electrode 11. A voltage step-down circuit 25 is connected between the power receiving apparatus side active electrode 22 and the power receiving apparatus side passive electrode 21, and a load circuit RL is connected to the voltage step-down circuit 25.

The high-frequency high-voltage generator circuit 13 applies a high-frequency high voltage between the power transmitting apparatus side active electrode 12 and the power transmitting apparatus side passive electrode 11. The voltage step-down circuit 25 steps down a voltage generated between the power receiving apparatus side active electrode 22 and the power receiving apparatus side passive electrode 21. The load circuit RL includes a rectifying and smoothing circuit for rectifying and smoothing the output of the voltage step-down circuit 25 and a secondary battery which is charged by the output of the rectifying and smoothing circuit.

The power receiving apparatus side passive electrode 21 is in contact with and has a DC connection with the power transmitting apparatus side passive electrode 11.

According to an embodiment of the present disclosure, since power is transmitted using a stepped-up high voltage, a current flowing through the power transmitting apparatus side passive electrode 11 may be on the order of several milliamperes, for example. In existing charging apparatuses in which a secondary battery is charged through the contact of contact electrodes, a loss due to contact resistance is large because a charging current on the order of several amperes directly flows through the contact. On the other hand, according to the present disclosure, since the influence of the contact resistance of a power transmitting apparatus side passive electrode is very small, there is no need to make the contact resistance small. Hence, various contact means such as conductive rubber can be used.

FIG. 3A is a side view of the power transmitting apparatus 101, and FIG. 3B is a side view of the power transmission system 401.

As illustrated in FIG. 3A, the power transmitting apparatus 101 includes a seat 10D and a backrest 10B perpendicular to the seat 10D. The seat 10D and the backrest 10B form a mounting portion for mounting the power receiving apparatus 201. The power transmitting apparatus side active electrode 12 is arranged along the seat 10D within a casing 10 of the power transmitting apparatus 101. The power transmitting apparatus side passive electrodes 11 are exposed on the backrest 10B. The power transmitting apparatus side passive electrodes 11 are electrically connected to a ground electrode 11G of the power transmitting apparatus through a connection conductor 11L.

As a result of the power transmitting apparatus side passive electrodes 11 being electrically connected to the ground electrode 11G through the connection conductor 11L, the power receiving apparatus side electrode 22 has the same potential as the ground of the power transmitting apparatus, whereby the potential of the power receiving apparatus side passive electrode 21 is stabilized and leakage of an undesirable electromagnetic field is suppressed.

As illustrated in FIG. 3B, the power receiving apparatus side active electrode 22 is formed along the bottom surface of the casing of the power receiving apparatus 201. The power receiving apparatus side passive electrode 21 is formed on the outer surface of the power receiving apparatus 201.

By mounting the power receiving apparatus 201 on the mounting portion of the power transmitting apparatus 101, the power receiving apparatus side active electrode 22 faces the power transmitting apparatus 101 side active electrode 12, with a dielectric layer (casing portion) therebetween, and the power receiving apparatus side passive electrode 21 is directly electrically connected to the power transmitting apparatus 101 side passive electrodes 11.

Figure 4:
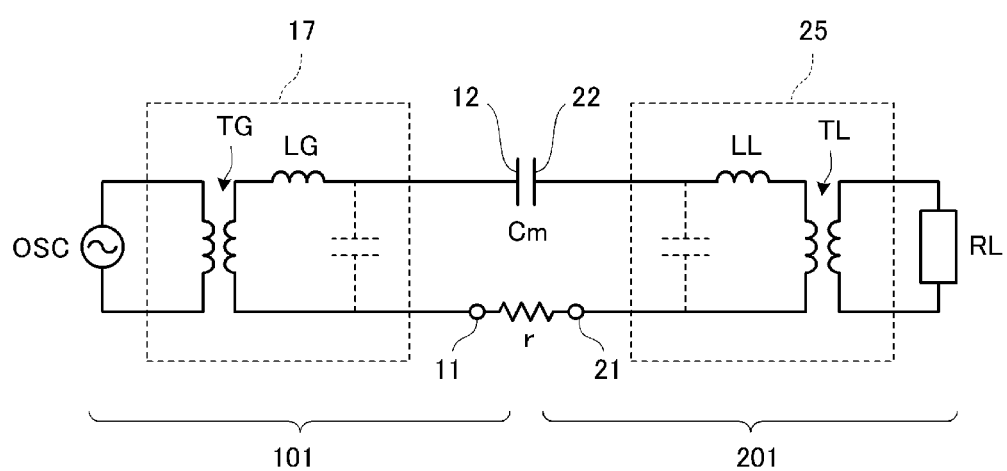
FIG. 4 is an equivalent circuit of the power transmission system.

FIG. 4 is an equivalent circuit of the power transmission system 401. A high-frequency voltage generator circuit OSC of the power transmitting apparatus 101 generates a high-frequency voltage with a frequency of about 100 kHz to tens of MHz, for example. A voltage step-up circuit 17 formed of a step-up transformer TG and an inductor LG applies a voltage generated by the high-frequency voltage generator circuit OSC between the passive electrodes 11 and the active electrode 12. A voltage step-down circuit 25 formed of a step-down transformer TL and an inductor LL is connected between the power receiving apparatus side passive electrode 21 and the power receiving apparatus side active electrode 22. The load circuit RL is connected to the secondary side of the step-down transformer TL. The load circuit RL is formed of a rectifying and smoothing circuit and a secondary battery.

A resistor r connected between the power transmitting apparatus side passive electrodes 11 and the power receiving apparatus side passive electrode 21 corresponds to a contact resistance formed at the contact portions between the power transmitting apparatus side passive electrodes 11 and the power receiving apparatus side passive electrode 21. A capacitor Cm connected between the power transmitting apparatus side active electrode 12 and the power receiving apparatus side active electrode 22 corresponds to a capacitance generated between the power transmitting apparatus side active electrode 12 and the power receiving apparatus side active electrode 22.

Assuming that the resistance of the resistor r is represented by r, and the capacitance of the capacitor Cm at the capacitance coupling portion is represented by Cm, r and Cm satisfies the relation $r \ll 1/\omega Cm$. In this manner, as a result of the passive electrodes of the power transmitting apparatus 101 and the power receiving apparatus 201 being directly electrically connected to each other, the potential of the power receiving apparatus side passive electrode 21 becomes nearly the same as that of the power transmitting apparatus side passive electrode 11. Hence, the potential of the power receiving apparatus side passive electrode 21 is stabilized, whereby fluctuation in the ground potential and leakage of an undesirable electromagnetic field are suppressed. Further, since stray capacitance is suppressed, the degree of coupling increases, resulting in high transmission efficiency.

A second exemplary embodiment will now be described with reference to the drawings.

Figure 5A:
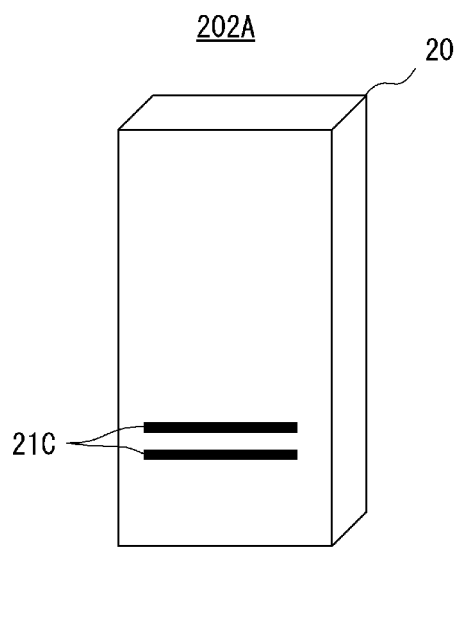
FIG. 5A is a perspective view of a power receiving apparatus according to a second exemplary embodiment as seen obliquely from the back.
Figure 5B:
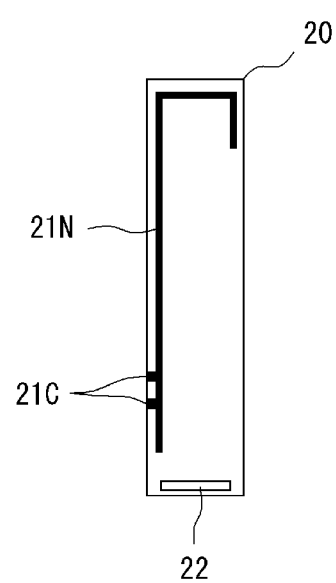
FIG. 5B is a sectional view of the power receiving apparatus.

FIG. 5A is a perspective view of a power receiving apparatus 202A according to a second exemplary embodiment as seen obliquely from the back, and FIG. 5B is a sectional view of the power receiving apparatus 202A. A casing 20 of the power receiving apparatus 202A is formed of an insulator (dielectric material). A power receiving apparatus side passive electrode 21N is formed along and within the casing 20. Power receiving apparatus side passive electrode connection conductors 21C are formed on the back surface of the casing 20 so as to be exposed. Further, a power receiving apparatus side active electrode 22 is formed along the casing 20 near the bottom surface of the casing 20.

Figure 6:
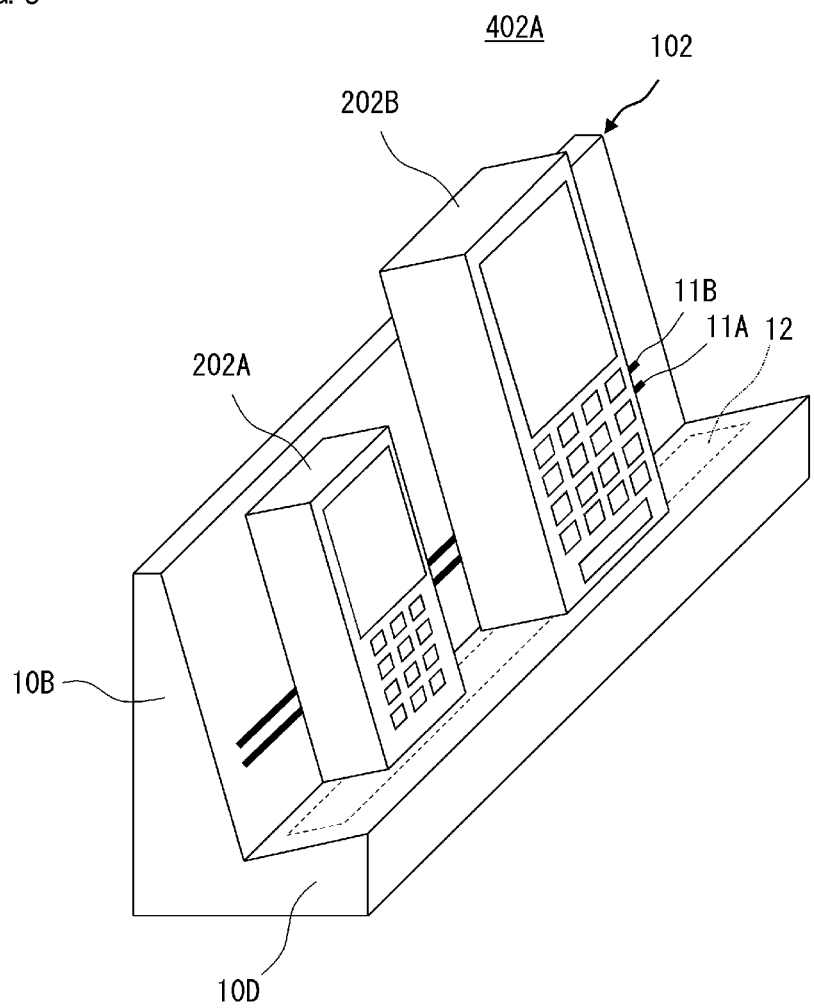
FIG. 6 is a perspective view of a power transmission system according to the second exemplary embodiment in a state of being used.

FIG. 6 is a perspective view of a power transmission system 402 according to the second exemplary embodiment in a state of being used. In this example, a power transmitting apparatus 102 has a sufficient size for mounting a plurality of power receiving apparatuses 202A and 202B. Power transmitting apparatus side passive electrodes 11A and 11B and a power transmitting apparatus side active electrode 12 are formed so as to extend along the direction of a valley formed by a seat 10D and a backrest 10B, so as to allow power to be transmitted irrespective of where on the seat 10D of the power transmitting apparatus 102 the power receiving apparatus is mounted.

In a state in which the power receiving apparatus 202A is mounted on the seat 10D of the power transmitting apparatus 102, the power receiving apparatus side passive electrode connection conductors 21C are directly electrically connected to the power transmitting apparatus side passive electrodes 11A and 11B, and the power receiving apparatus side active electrode 22 faces the power transmitting apparatus side active electrode 12 with a dielectric layer therebetween. The same is true for the power receiving apparatus 202B. In this manner, power can be transmitted from a single power transmitting apparatus to a plurality of power receiving apparatuses.

Figure 7:
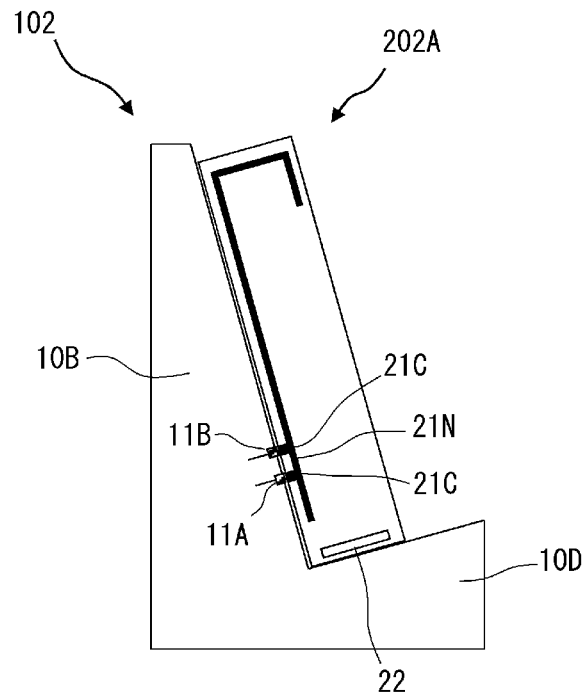
FIG. 7 is a sectional view of the power transmission system according to the second exemplary embodiment in a state of being used.

FIG. 7 is a sectional view of the power transmission system 402 in a state of being used. In a state in which the power receiving apparatus 202A is mounted on the seat 10D of the power transmitting apparatus 102, the power receiving apparatus side passive electrode connection conductors 21C and 21C are respectively directly electrically connected to the power transmitting apparatus side passive electrodes 11A and 11B. Hence, the power transmitting apparatus side passive electrodes 11A and 11B are electrically connected to each other through the power receiving apparatus side passive electrode 21N.

A control unit within the power transmitting apparatus 102 determines whether or not a power receiving apparatus is mounted by detecting whether or not the power transmitting apparatus side passive electrodes 11A and 11B are electrically connected to each other.

Figure 8:
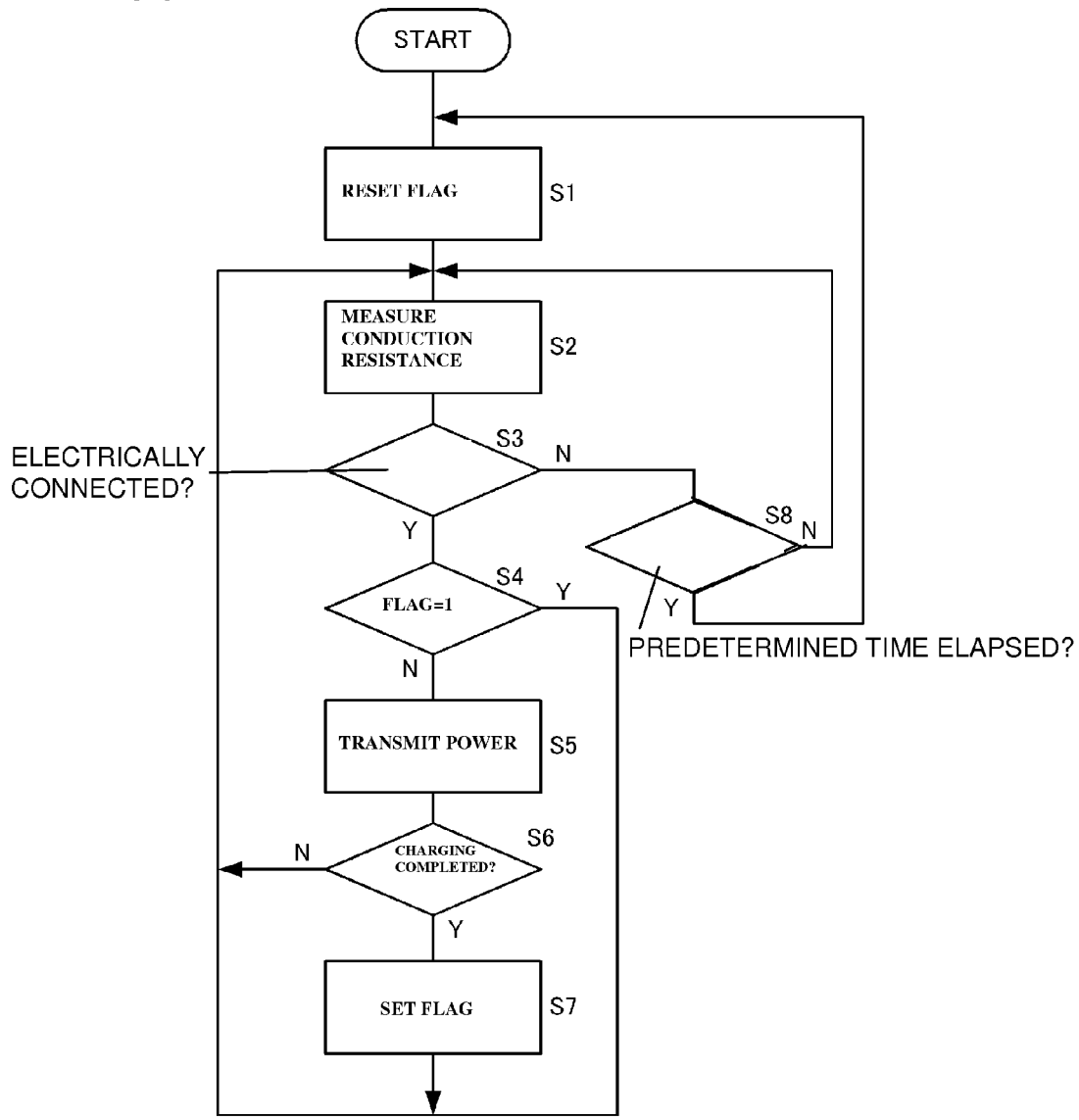
FIG. 8 is a flowchart illustrating the processing performed by a control unit within the power transmission system according to the second exemplary embodiment.

FIG. 8 is a flowchart illustrating the processing performed by the control unit. First, a flag is reset as an initialization step (S1). This flag indicates whether or not charging is finished. Then, conduction resistance between the power transmitting apparatus side passive electrodes 11A and 11B is measured (S2). When the passive electrodes are electrically connected to each other, power is transmitted (S3→S4→S5). The above steps are repeated until charging is completed (S6→S2→S3→S4→ ... ). When charging is completed, the flag is set and the flow returns to step S2 (S6→S7→S2). While the flag is set, power is not transmitted (S3→S4→S2). When the power receiving apparatus 202A is unmounted from the power transmitting apparatus 102, the flag is reset after waiting for a predetermined period of time, and the flow returns to the initial state (S8→S1).

In this manner, it is determined whether or not a power receiving apparatus is mounted by detecting whether or not a power receiving apparatus side passive electrode is electrically connected to power transmitting apparatus side passive electrodes, whereby processing in accordance with the determination is performed. As a result of this, it is easily and reliably determined whether or not a power receiving apparatus is mounted on a power transmitting apparatus.

A third exemplary embodiment will now be described with reference to the drawings.

FIG. 9A is a perspective view of a power transmission system 403 according to a third exemplary embodiment. FIG. 9B is a side view illustrating a state immediately before a power receiving apparatus 203 is mounted on a power transmitting apparatus 103. The top surface of the power transmitting apparatus 103 is a mounting surface. The power receiving apparatus 203 is mounted on this mounting surface.

The casing of the power transmitting apparatus 103 has a power transmitting apparatus side passive electrode 11 arranged on the mounting surface thereof and a power transmitting apparatus side active electrode 12 arranged along the mounting surface thereof. A power receiving apparatus side passive electrode 21 is provided on the bottom surface of the power receiving apparatus 203, and a power receiving apparatus side active electrode 22 is provided along the bottom surface of the power receiving apparatus 203.

In a state in which the power receiving apparatus 203 is mounted on the power transmitting apparatus 103, the power receiving apparatus side passive electrode 21 is directly electrically connected to the power transmitting apparatus side passive electrode 11, and the power receiving apparatus side active electrode 22 faces the power transmitting apparatus side active electrode 12 with a dielectric layer therebetween.

Note that, by making the power receiving apparatus side active electrode 22 have a larger area than the power transmitting apparatus side active electrode 12, the power transmitting apparatus side active electrode 12 is covered by the power receiving apparatus side active electrode 22. As a result, stray capacitance generated between the power transmitting apparatus side active electrode 12 and external conductors becomes small, whereby leakage of an electric field from the power transmitting apparatus side active electrode 12 is reduced.

In this manner, power can also be transmitted by mounting the power receiving apparatus on a mounting portion in the plane of the power transmitting apparatus.

A fourth exemplary embodiment will now be described with reference to the drawings.

Figure 10A:
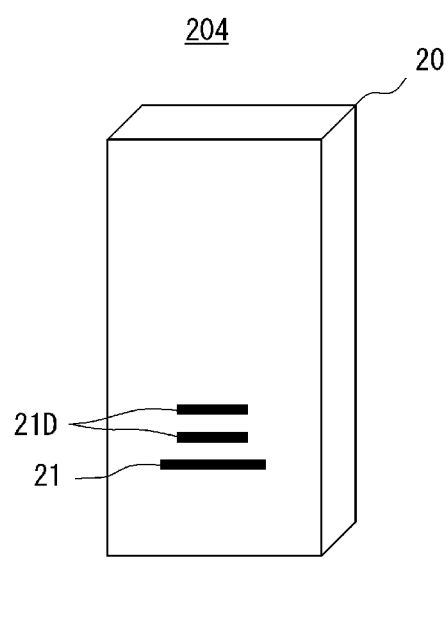
FIG. 10A is a perspective view of a power receiving apparatus according to a fourth exemplary embodiment as seen obliquely from the back.
Figure 10B:
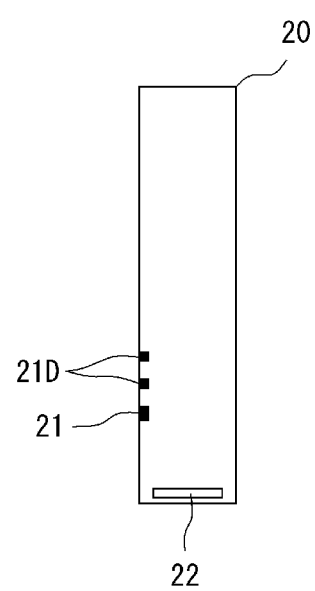
FIG. 10B is a sectional view of the power receiving apparatus.

FIG. 10A is a perspective view of a power receiving apparatus 204 according to a fourth exemplary embodiment as seen obliquely from the back, and FIG. 10B is a sectional view of the power receiving apparatus 204. A casing 20 of the power receiving apparatus 202A is formed of an insulator (dielectric material). A power receiving apparatus side passive electrode 21 is formed on the back surface of the casing 20 so as to be exposed. In addition, power receiving apparatus side communication electrodes 21D are formed on the back surface of the casing 20 so as to be exposed. Further, a power receiving apparatus side active electrode 22 is formed near the bottom surface of the casing 20 along the casing 20.

Figure 11A:
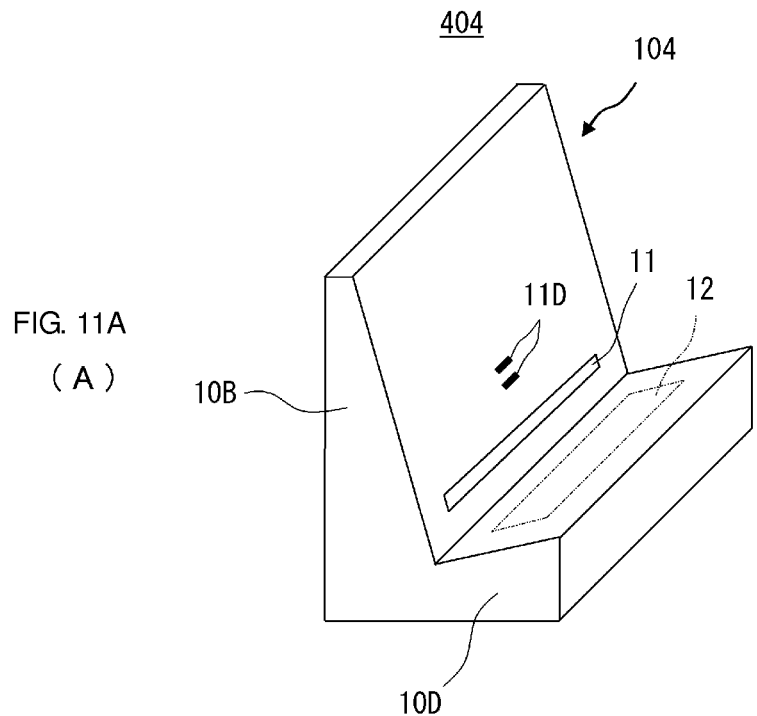
FIG. 11A is perspective view of a power transmission system according to a fourth exemplary embodiment, in a state of being used.
Figure 11B:
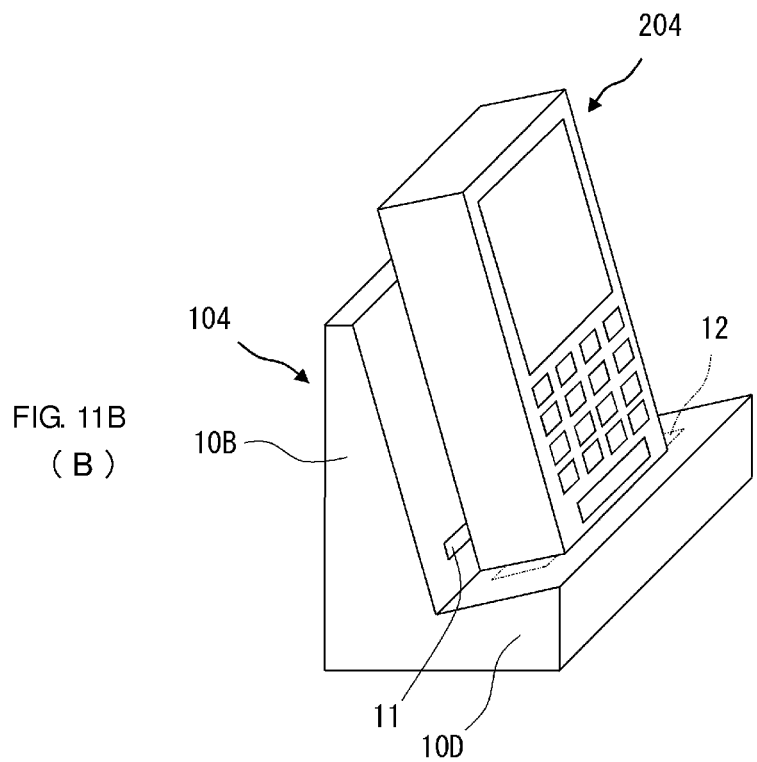
FIG. 11B is another perspective view of a power transmission system according to a fourth exemplary embodiment, in a state of being used.

FIGS. 11A and 11B are perspective views of a power transmission system 404 according to the fourth exemplary embodiment, in a state of being used. In this example, a power transmitting apparatus side passive electrode 11 and a power transmitting apparatus side active electrode 12 are formed so as to extend along a valley formed by a seat 10D and a backrest 10B of a power transmitting apparatus 104. Power transmitting apparatus side communication electrodes 11D are formed on the backrest 10B so as to be exposed.

In a state in which the power receiving apparatus 204 is mounted on the seat 10D of the power transmitting apparatus 104, the power receiving apparatus side passive electrode 21 is directly electrically connected to the power transmitting apparatus side passive electrode 11, and the power receiving apparatus side active electrode 22 faces the power transmitting apparatus side active electrode 12 with a dielectric layer therebetween. The power receiving apparatus side communication electrodes 21D are electrically connected to the power transmitting apparatus side communication electrodes 11D.

In this manner, power is transmitted from a power transmitting apparatus to a power receiving apparatus, and also, dada can be communicated between the two apparatuses. For example, in the case in which the power transmitting apparatus is a charger and the power receiving apparatus is a portable electronic apparatus housing a secondary battery, the power transmitting apparatus (charger) can control charging of the secondary battery within the power receiving apparatus (portable electronic apparatus) while monitoring the state of the battery through communication of necessary data between the power transmitting apparatus (charger) and the power receiving apparatus (portable electronic apparatus).

A fifth exemplary embodiment will now be described with reference to the drawings.

In a fifth exemplary embodiment, a specific example of power transmitting apparatus side grounding impedance is described.

Figure 12A:
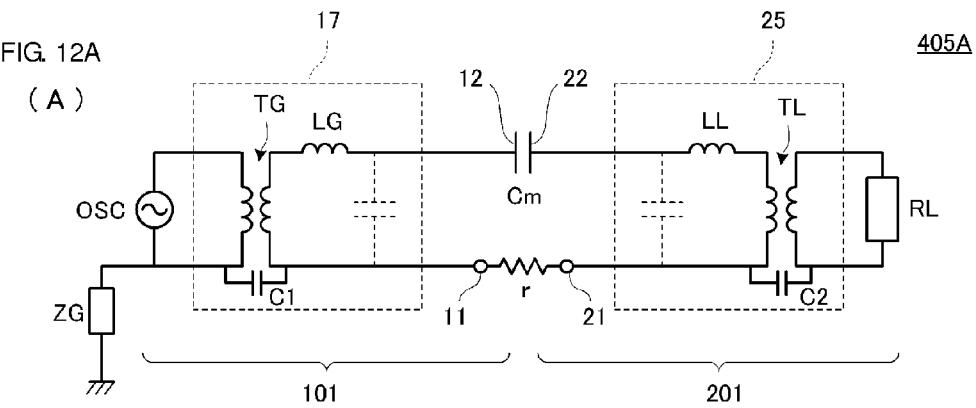
FIG. 12A is equivalent circuit diagrams of three power transmission systems according to a fifth exemplary embodiment.
Figure 12B:
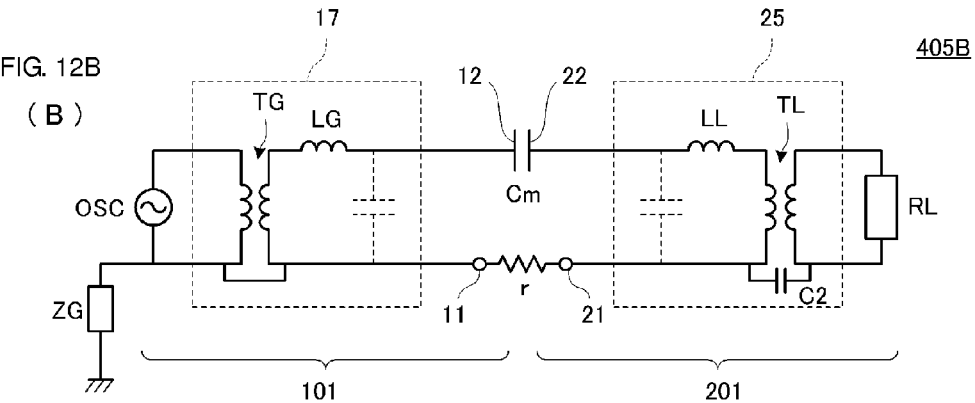
FIG. 12B is another equivalent circuit diagrams of three power transmission systems according to a fifth exemplary embodiment.
Figure 12C:
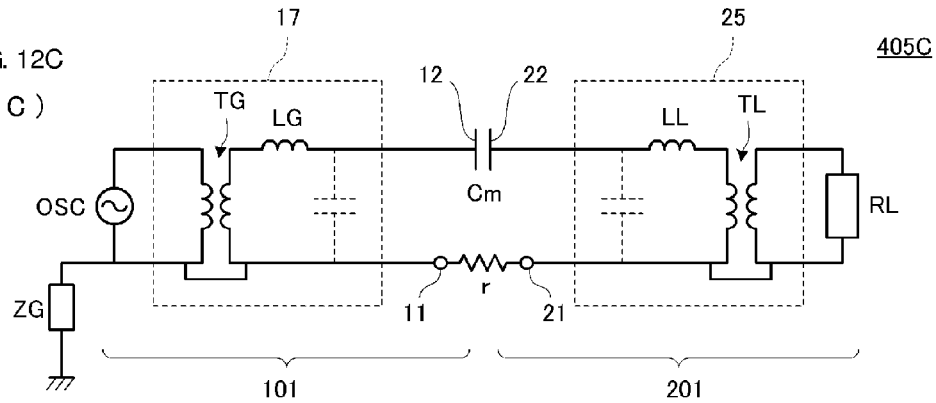
FIG. 12C is another equivalent circuit diagrams of three power transmission systems according to a fifth exemplary embodiment.

FIGS. 12A, 12B, and 12C are equivalent circuit diagrams of three power transmitting apparatuses according to the fifth exemplary embodiment. Each of them illustrates grounding impedance ZG of the power transmitting apparatus 101 as a circuit component.

The power transmitting apparatus side passive electrode 11 is connected to the reference potential of an input power system of the power transmitting apparatus 101 through the grounding impedance ZG. Here, the grounding impedance ZG corresponds to a low impedance resistor conducting a DC current, or a low impedance capacitor conducting an AC current. The "reference potential of an input power system of the power transmitting apparatus 101" is the potential of a room or the ground.

When the input power supply of the power transmitting apparatus 101 is a battery, the grounding impedance ZG is the grounding stray capacitance of the battery, and when the input power supply is an AC adaptor, the grounding impedance ZG is stray capacitance between the primary and secondary sides of a transformer within the AC adapter. When the input power supply of the power transmitting apparatus 101 is a commercial power supply which can be grounded, the grounding impedance ZG is the resistance of a line electrically connected to the ground of the commercial power supply or the resistance of a resistor which is intentionally connected. Note that even when the grounding impedance ZG is the stray capacitance described above, this is sufficiently low impedance for a frequency band (for example, 100 kHz to tens of MHz) used for the power transmission.

In the example of a power transmission system 405A illustrated in FIG. 12A, the primary side and secondary side of the step-up transformer TG are connected through capacitance C1. Similarly, the primary side and secondary side of the step-down transformer TL are connected through capacitance C2.

In the example of a power transmission system 405B illustrated in FIG. 12B, the reference potential sides of the primary side and secondary side of the step-up transformer TG are directly electrically connected. In other words, the reference potential of the power transmitting apparatus 101 is common to the primary side and secondary side of the step-up transformer TG. The primary side and secondary side of the step-down transformer TL is coupled through capacitance C2.

In the example of a power transmission system 405C illustrated in FIG. 12C, the reference potential of the power transmitting apparatus 101 is common to the primary side and secondary side of the step-up transformer TG. Similarly, the reference potential of the power receiving apparatus 201 is common to the primary side and secondary side of the step-down transformer TL. Particularly, in the configuration illustrated in FIG. 12C, when the grounding impedance ZG is resistance, which conducts a DC current, the whole power transmission system 405C is not electrostatically charged.

In any of the configurations illustrated in FIGS. 12A to 12C the ground of the power transmitting apparatus 101 is connected to the reference potential of the input power supply of the power transmitting apparatus 101 through low impedance for DC or AC. Since the power receiving apparatus side passive electrode 21 is electrically connected to the power transmitting apparatus side passive electrode 11 for DC, not only the power transmitting apparatus side passive electrode 11 but also the power receiving apparatus side passive electrode 21 has a potential about the same as the potential of the commercial power supply.

Since fluctuation in the ground potential of the whole power transmission system is suppressed in this manner, even when the power receiving apparatus is provided with a capacitive touch panel, for example, the ground potential (reference potential) of the power receiving apparatus is stable, whereby a malfunction of the power receiving apparatus side load circuit RL is prevented.

A sixth exemplary embodiment will now be described with reference to the drawings.

A sixth exemplary embodiment allows flexibility in the manner in which a power receiving apparatus is mounted on a power transmitting apparatus to be increased compared with the second exemplary embodiment.

Figure 13A:
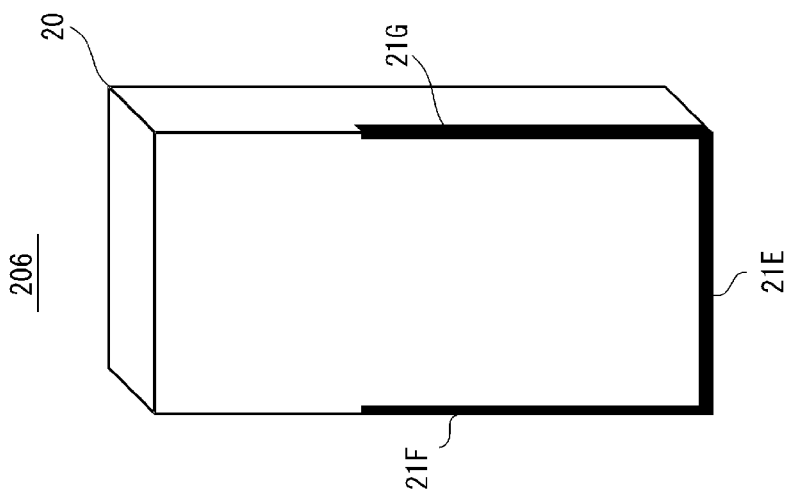
FIG. 13A is a perspective view of a power receiving apparatus according to a sixth exemplary embodiment as seen obliquely from the back.
Figure 13B:
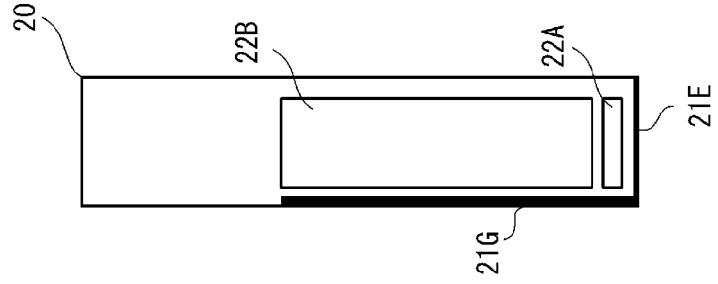
FIG. 13B is a sectional side views of the power receiving apparatus.
Figure 13C:
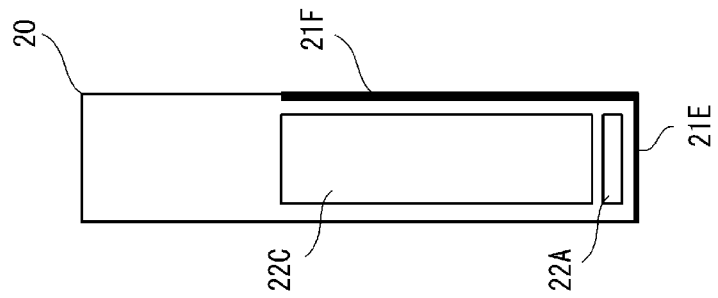
FIG. 13C is another sectional side views of the power receiving apparatus.

FIG. 13A is a perspective view of a power receiving apparatus 206 according to a sixth exemplary embodiment as seen obliquely from the back, and FIGS. 13B and 13C are sectional side views of the power receiving apparatus 206. A casing 20 of the power receiving apparatus 206 is formed of an insulator (dielectric material). Power receiving apparatus side passive electrodes 21E, 21F, and 21G are formed within and along the casing 20 so as to be exposed. More specifically, the power receiving apparatus side passive electrode 21E is formed at the edge between the bottom surface and back surface of the casing 20, and the power receiving apparatus side passive electrodes 21F and 21G are formed at the edges between the back surface and side surfaces of the casing 20. In addition, a power receiving apparatus side active electrode 22A is formed along the bottom surface of the casing 20, and power receiving apparatus side active electrodes 22B and 22C are formed along the side surfaces of the casing 20.

Figure 14:
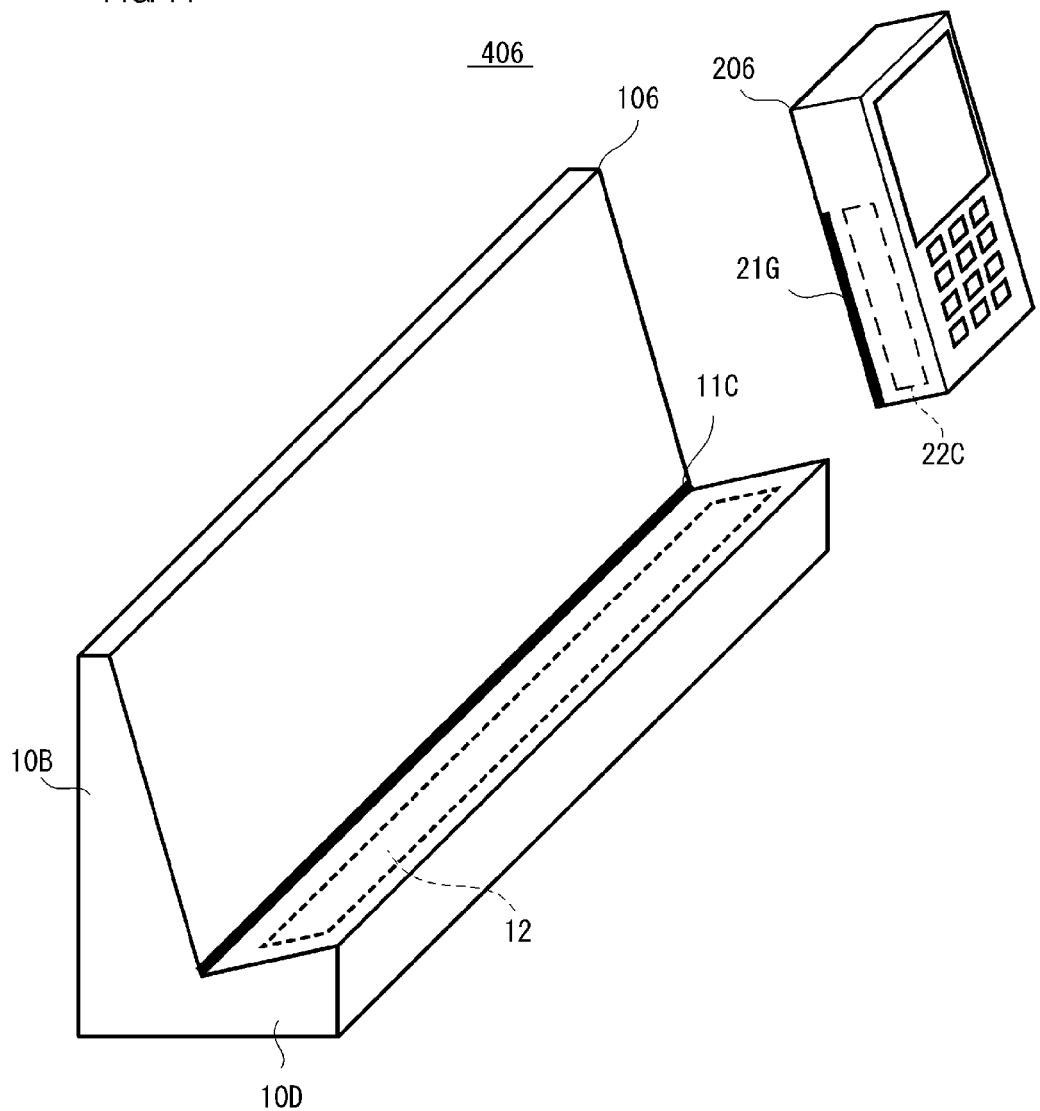
FIG. 14 is a perspective view of a power transmission system according to a sixth exemplary embodiment, in a state of being used.

FIG. 14 is a perspective view of a power transmission system 406 according to the sixth exemplary embodiment, in a state of being used. A power transmitting apparatus side passive electrode 11C and a power transmitting apparatus side active electrode 12 are formed so as to extend along a valley formed by a seat 10D and a backrest 10B of a power transmitting apparatus 106, so as to allow power to be transmitted irrespective of where on the seat 10D of the power transmitting apparatus 106 a power receiving apparatus is mounted. The power transmitting apparatus side passive electrode 11C is formed so as to be exposed at the valley formed by the seat 10D and the backrest 10B. The power transmitting apparatus side active electrode 12 is arranged along the seat 10D.

In a state in which the power receiving apparatus 206 is mounted on the seat 10D of the power transmitting apparatus 106, one of the power receiving apparatus side passive electrodes 21E, 21F, and 21G is directly electrically connected to the power transmitting apparatus side passive electrode 11C, and one of the power receiving apparatus side active electrodes 22A, 22B, and 22C faces the power transmitting apparatus side active electrode 12 with a dielectric layer therebetween.

For example, when the bottom surface of the power receiving apparatus 206 is mounted on the seat 10D, the power receiving apparatus side passive electrode 21E is directly electrically connected to the power transmitting apparatus side passive electrode 11C. Further, the power receiving apparatus side active electrode 22A faces the power transmitting apparatus side active electrode 12 with a dielectric layer therebetween. When one of the side surfaces of the power receiving apparatus 206 is mounted on the seat 10D, the power receiving apparatus side passive electrode 21F (or 21G) is directly electrically connected to the power transmitting apparatus side passive electrode 11C, and the power receiving apparatus side active electrode 22C (or 22B) faces the power transmitting apparatus side active electrode 12 with a dielectric layer therebetween.

In this manner, in the sixth exemplary embodiment, power can be transmitted irrespective of whether the power receiving apparatus 206 is vertically mounted on the power transmitting apparatus 106 with the bottom surface of the casing 20 facing downward or horizontally mounted on the power transmitting apparatus 106 with one of the side surfaces facing downward. Hence, flexibility in the manner in which the power receiving apparatus 206 is mounted on the power transmitting apparatus 106 is increased.

Figure 15:
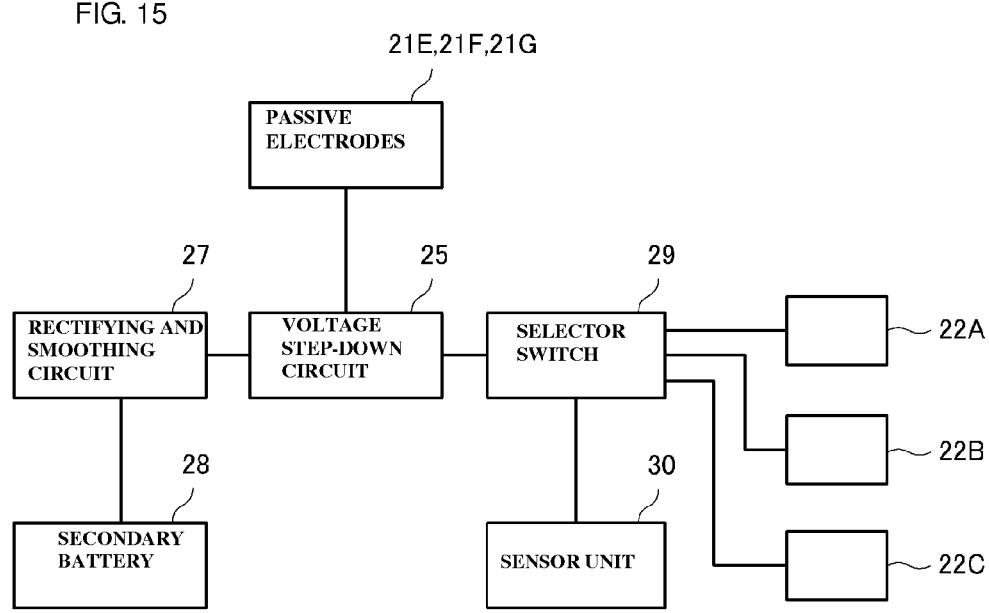
FIG. 15 is a circuit diagram of the power receiving apparatus which is part of the power transmission system according to the sixth exemplary embodiment.

FIG. 15 is a circuit diagram of the power receiving apparatus 206 which is part of the power transmission system according to the sixth exemplary embodiment. The power receiving apparatus 206 of the sixth exemplary embodiment is configured to selectively connect one of the three power receiving apparatus side active electrodes 22A, 22B, and 22C to the voltage step-down circuit 25 using a selector switch 29.

The selector switch 29 selects one of the power receiving apparatus side active electrodes 22A, 22B, and 22C in accordance with the detection results of a sensor unit 30 (corresponding to a "detecting unit" of the disclosure). The sensor unit 30 includes a sensor that detects the direction of gravity acceleration, and the sensor unit 30 detects which active electrode of the power receiving apparatus 206 faces the power transmitting apparatus side active electrode 12 of the power transmitting apparatus 106. The selector switch 29 selects the power receiving apparatus side active electrode facing the power transmitting apparatus side active electrode 12 of the power transmitting apparatus 106. As a result of this, since a high potential is not applied to the active electrodes which have not been selected and are in a floating state, undesirable radiation noise is decreased. Note that the active electrodes which have not been selected may be connected to the passive electrode. This allows the total area of the passive electrodes to be increased.

A seventh exemplary embodiment will now be described with reference to the drawings.

A seventh exemplary embodiment allows flexibility in the way in which a power receiving apparatus is mounted on a power transmitting apparatus to be further increased, similarly to the sixth exemplary embodiment.

Figure 16C:
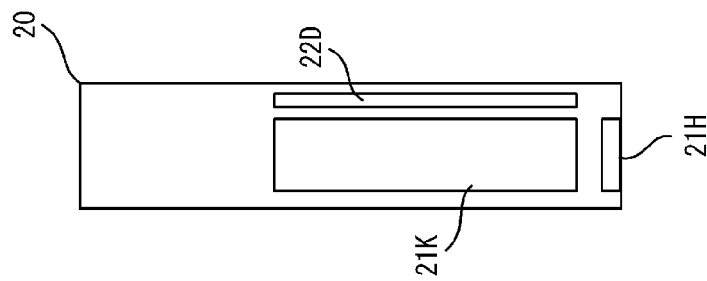
FIGS. 16B and 16C are sectional side views of the power receiving apparatus.
Figure 16B:
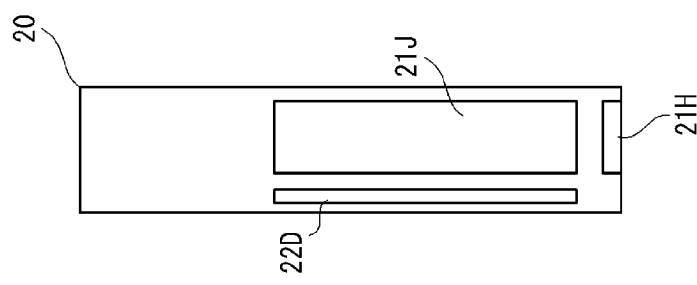
Figure 16A:
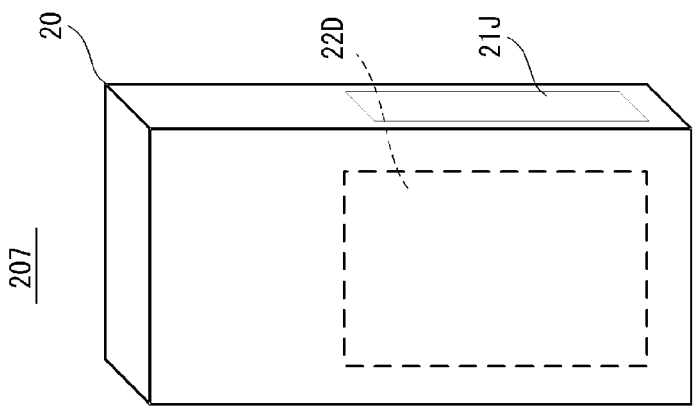
FIG. 16A is a perspective view of a power receiving apparatus according to a seventh exemplary embodiment as seen obliquely from the back.

FIG. 16A is a perspective view of a power receiving apparatus 207 according to a seventh exemplary embodiment as seen obliquely from the back, and FIGS. 16B and 16C are sectional side views of the power receiving apparatus 207. A casing 20 of the power receiving apparatus 207 is formed of an insulator (dielectric material). Power receiving apparatus side passive electrodes 21H, 21J, and 21K are formed within and along the casing 20 so as to be exposed. More specifically, the power receiving apparatus side passive electrode 21H is formed along the bottom surface of the casing 20, and the power receiving apparatus side passive electrodes 21J and 21K are respectively provided along the side surfaces of the casing 20. In addition, a power receiving apparatus side active electrode 22D is formed along the back surface of the casing 20.

Figure 17:
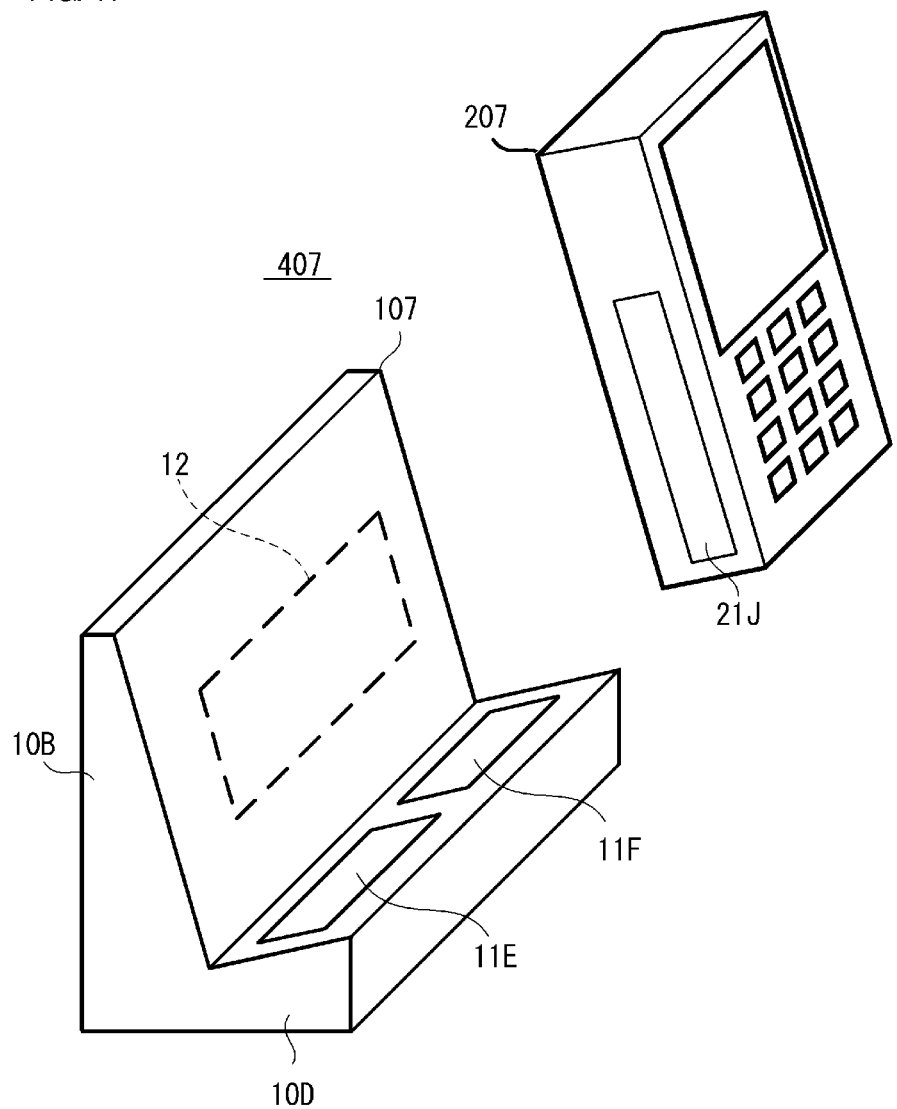
FIG. 17 is a perspective view of a power transmission system according to the seventh exemplary embodiment in a state of being used.

FIG. 17 is a perspective view of a power transmission system 407 according to the seventh exemplary embodiment in a state of being used. Power transmitting apparatus side passive electrodes 11E and 11F, which are substantially shaped like rectangles (strips), are formed so as to be exposed on a seat 10D in a substantially straight line such that they are separated from each other and the short sides thereof are substantially parallel with each other. A power transmitting apparatus side active electrode 12 is formed along a backrest 10B.

In a state in which the power receiving apparatus 207 is mounted on the seat 10D of the power transmitting apparatus 107, one of the power receiving apparatus side passive electrodes 21H, 21J, and 21K is directly electrically connected to the power transmitting apparatus side passive electrodes 11E and 11F, and the power receiving apparatus side active electrode 22D is formed along the back surface of the power receiving apparatus 207 so as to face the power transmitting apparatus side active electrode 12 with a dielectric layer therebetween.

For example, when the bottom surface of the power receiving apparatus 207 is mounted on the seat 10D, the power receiving apparatus side passive electrode 21H is directly electrically connected to the power transmitting apparatus side passive electrodes 11E and 11F. In addition, the power receiving apparatus side active electrode 22D faces the power transmitting apparatus side active electrode 12 with a dielectric layer therebetween. When one of the side surfaces of the power receiving apparatus 207 is mounted on the seat 10D, the power receiving apparatus side passive electrode 21J (or 21K) is directly electrically connected to the power transmitting apparatus side passive electrodes 11E and 11F, and the power receiving apparatus side active electrode 22D faces the power transmitting apparatus side active electrode 12 with a dielectric layer therebetween. The power receiving apparatus side active electrode 22D is designed such that the distance from the mounting surface of the seat 10D does not change in accordance with the mounting orientation.

In this manner, in the seventh exemplary embodiment, power can be transmitted irrespective of whether the power receiving apparatus 207 is vertically mounted or horizontally mounted on the power transmitting apparatus 107, allowing flexibility in the manner in which the power receiving apparatus 207 is mounted on the power transmitting apparatus 107 to be increased. Further, the likelihood of the occurrence of poor contact between the passive electrodes is reduced by providing the power transmitting apparatus side passive electrodes 11E and 11F on the seat 10D and providing the power receiving apparatus side passive electrodes 21H, 21J, and 21K on the bottom surface and the side surfaces that are in surface contact with the seat 10D when the power receiving apparatus 207 is mounted.

When the power receiving apparatus 207 is mounted on the power transmitting apparatus 107, and one of the power receiving apparatus side passive electrodes 21H, 21J, and 21K is in contact with both of the power transmitting apparatus side passive electrodes 11E and 11F separated from each other, the power transmitting apparatus side passive electrodes 11E and 11F are electrically connected to each other through the one of the power receiving apparatus side passive electrodes 21H, 21J, and 21K in contact with the power transmitting apparatus side passive electrodes 11E and 11F. Hence, by detecting whether or not the power transmitting apparatus side passive electrodes 11E and 11F are electrically connected to each other, it can be determined whether or not the power receiving apparatus 207 is mounted on the power transmitting apparatus 107.

Figure 18A:
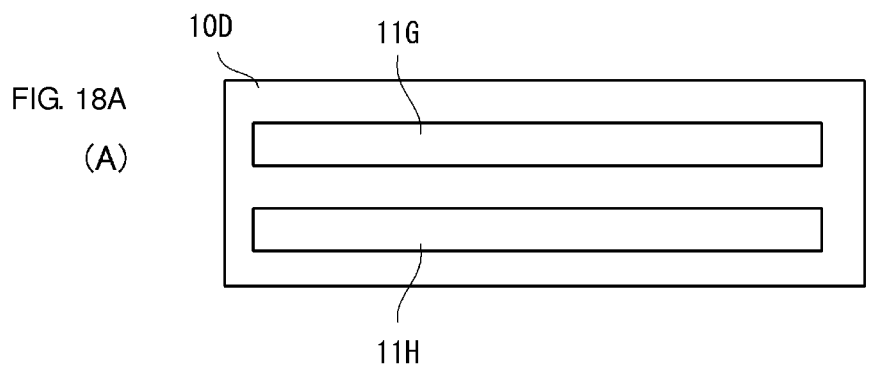
FIG. 18A is schematic diagrams illustrating another shape of power transmitting apparatus side passive electrodes for detecting mounting of the power receiving apparatus.
Figure 18B:
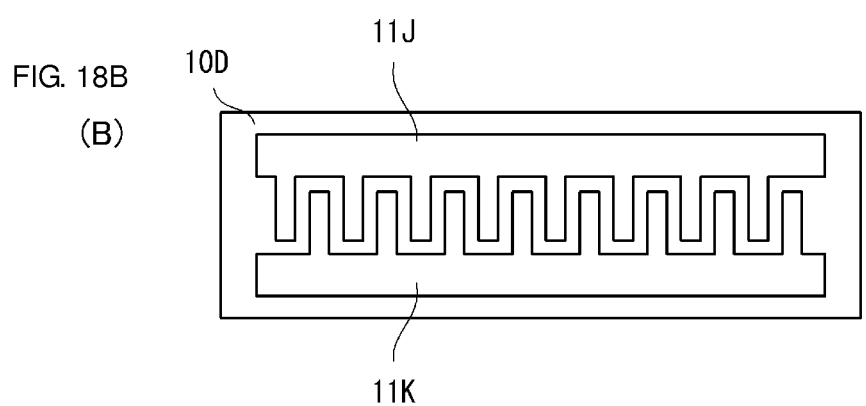
FIG. 18B is schematic diagrams illustrating another shape of power transmitting apparatus side passive electrodes for detecting mounting of the power receiving apparatus.

Note that the shapes of the power transmitting apparatus side passive electrodes for detecting mounting of the power receiving apparatus 207 are not limited to the configuration illustrated in FIG. 17. FIGS. 18A and 18B are schematic diagrams illustrating other shapes of the power transmitting apparatus side passive electrodes for detecting mounting of the power receiving apparatus 207. FIGS. 18A and 18B are the diagrams of only the seat 10D of the power transmitting apparatus 107 seen from above.

Referring to FIG. 18A, the two passive electrodes for detecting whether or not the power receiving apparatus 207 is mounted on the power transmitting apparatus 107 may be power transmitting apparatus side passive electrodes 11G and 11H, which are substantially shaped like strips extending in the longitudinal direction of the seat 10D and substantially arranged in parallel with each other. In this case, two electrodes can be provided even when the seat 10D has a small width. Further, even when the power receiving apparatus 207 is mounted so as to be displaced off-center in the longitudinal direction of the seat 10D, the passive electrode of the power receiving apparatus 207 is in contact with both of the power transmitting apparatus side passive electrodes 11G and 11H, whereby mounting of the power receiving apparatus 207 is reliably detected.

Referring to FIG. 18B, the two passive electrodes for detecting whether or not the power receiving apparatus 207 is mounted on the power transmitting apparatus 107 may be power transmitting apparatus side passive electrodes 11J and 11K, which are formed of a pair of substantially comb-shaped electrodes. In this case, the power transmitting apparatus side passive electrodes 11J and 11K are provided, facing each other, on the seat 10D such that the electrode fingers of the power transmitting apparatus side passive electrodes 11J and 11K are arranged alternately. The slender electrode fingers of the passive electrode 11J and the slender electrode fingers of the passive electrode 11K are arranged alternately with small gaps therebetween. Hence, by making the passive electrodes be a pair of substantially comb-shaped electrodes having mutually interdigitated electrode fingers, two electrodes can be provided even when the seat 10D has a small width. Further, even when the seat 10D has a narrow width, the contact area between the power transmitting apparatus side passive electrode and the power receiving apparatus side passive electrode can be increased.

Note that the power receiving apparatus side passive electrodes 21H, 21J, and 21K may be arranged individually and separately or may be formed of a single electrode. It is preferable that the power receiving apparatus side passive electrodes 21H, 21J, and 21K be arranged near the bottom surface of the casing 20 so as to surround modules such as the voltage step-down circuit 25 provided in the power receiving apparatus 207. In this case, since the modules such as the voltage step-down circuit 25 are electrostatically shielded the power receiving apparatus side passive electrodes 21H, 21J, and 21K, noise generated by a transformer or the like during power transmission is decreased.

Further, a configuration may be used in which the power receiving apparatus 207 side passive electrode is divided into two and mounting of the power receiving apparatus is detected on the power receiving apparatus side, whereby the power transmitting apparatus is notified of the detection result.

Further, the power transmitting apparatus side passive electrode 11C in the sixth exemplary embodiment may be divided into two electrodes similarly to the power transmitting apparatus side passive electrodes 11E and 11F of the present embodiment, thereby detecting whether or not a power receiving apparatus is mounted.

A eighth exemplary embodiment will now be described with reference to the drawings.

Figure 19:
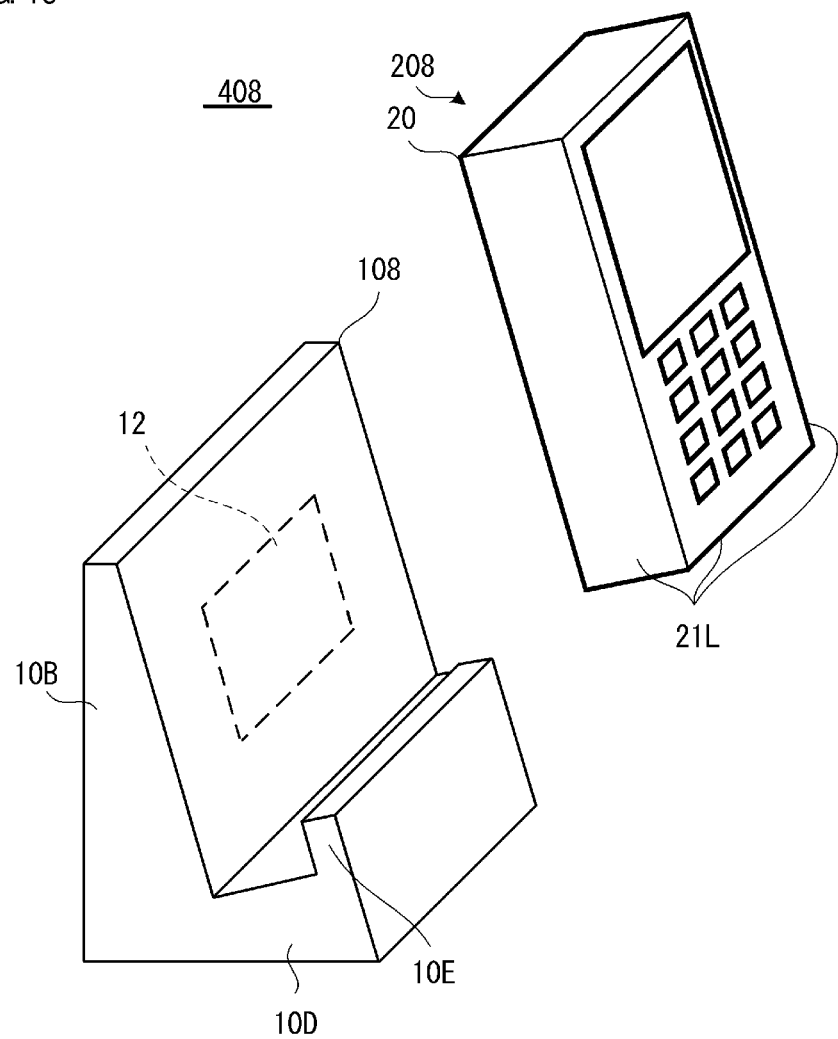
FIG. 19 is a perspective view of a power transmission system according to an eighth exemplary embodiment in a state of being used.
Figure 20:
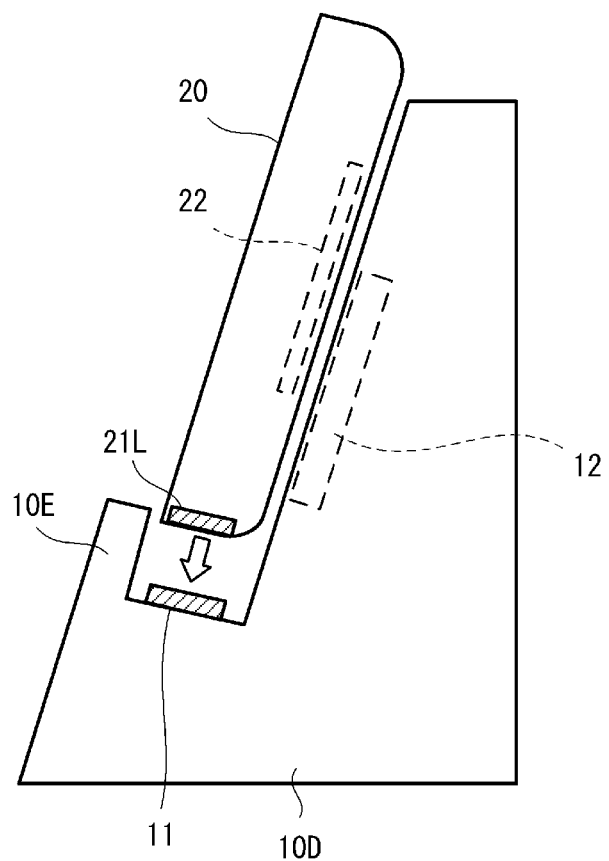
FIG. 20 is a sectional side view of the power transmission system according to the eighth exemplary embodiment in a state of being used.

In an eighth exemplary embodiment, a power receiving apparatus side passive electrode forms part of a casing. FIG. 19 is a perspective view of a power transmission system 408 according to the eighth exemplary embodiment in a state of being used. FIG. 20 is a sectional side view of the power transmission system 408 according to the eighth exemplary embodiment in a state of being used.

A holder 10E for mounting a power receiving apparatus 208 so as to hold it between the holder 10E and a backrest 10B is provided at the front surface of a power transmitting apparatus 108 substantially in parallel with the backrest 10D.

Power transmitting apparatus side passive electrodes 11, which are substantially shaped like rectangles (strips), are formed so as to be exposed on a seat 10D in a substantially straight line such that they are separated from each other and the short sides thereof are substantially parallel with each other. The power transmitting apparatus side passive electrodes 11 may be two electrodes as in the seventh exemplary embodiment, or may be a single electrode. A power transmitting apparatus side active electrode 12 is formed along the backrest 10B as in the seventh exemplary embodiment.

A casing 20 of the power receiving apparatus 208 is formed of an insulator (dielectric material), and part of the casing 20, specifically the two side surfaces and the bottom surface, is formed of a power receiving apparatus side passive electrode 21L. Further, a power receiving apparatus side active electrode 22 is formed along the back surface of the casing 20.

The power receiving apparatus 208 is mounted on the seat 10D so as to be inserted between the backrest 10B and the holder 10E of the power transmitting apparatus 108 in the direction of an arrow illustrated in FIG. 20. In this state, the power receiving apparatus side passive electrode 21L on any of the two side surfaces of the power receiving apparatus 208 and the bottom surface is directly electrically connected to the power transmitting apparatus side passive electrode 11, and the power receiving apparatus side active electrode 22 faces the power transmitting apparatus side active electrode 12 with a dielectric layer therebetween. Note that the power receiving apparatus 208 may be mounted with any of the two side surfaces and the bottom surface facing the seat 10D.

In this manner, since the direction of inserting the power receiving apparatus 208 is the same as the direction of contact between the power receiving apparatus side passive electrode 21L and the power transmitting apparatus side passive electrode 11, and the passive electrodes are in face contact with each other, poor contact between the passive electrodes is unlikely to occur. Further, by making the power receiving apparatus side passive electrode 21L, which is in contact with the power transmitting apparatus side passive electrode 11, be part of the casing 20, the contact portion of the power receiving apparatus 208 becomes inconspicuous, whereby the appearance of the power receiving apparatus 208 is not spoiled.

In the eighth exemplary embodiment, although the two side surfaces and bottom surface of the casing 20 are formed of the power receiving apparatus side passive electrode 21L, part of the front surface and the back surface may be formed of the passive electrode. Modules such as the voltage step-down circuit 25 included in the power receiving apparatus 208 are preferably arranged at a location surrounded by the passive electrode that forms part of the casing 20.

Figure 21:
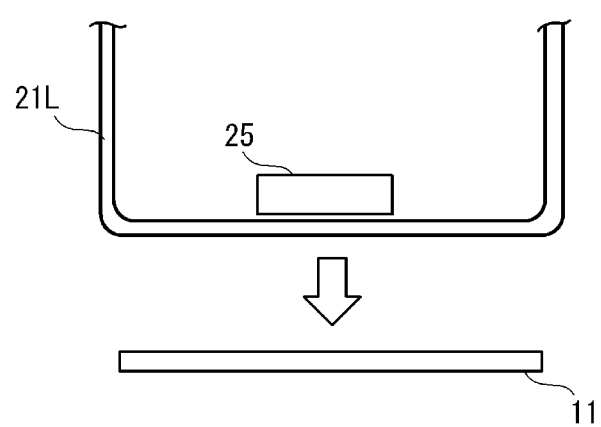
FIG. 21 is an arrangement diagram of modules such as a voltage step-down circuit in a power receiving apparatus.

FIG. 21 is an arrangement diagram of modules such as the voltage step-down circuit 25 in the power receiving apparatus 208. By surrounding the modules such as the voltage step-down circuit 25 with the power receiving apparatus side passive electrode 21L, as illustrated in FIG. 21, noise generated from the modules such as the voltage step-down circuit 25 during power transmission can be shielded with the metal of the power receiving apparatus side passive electrode 21L. Thereby, undesirable influence on the power transmission caused by the generated noise is decreased.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A power receiving apparatus forming a pair with a power transmitting apparatus in which a high-frequency high-voltage generator circuit that applies a high-frequency high voltage is connected between a power transmitting apparatus side active electrode and a power transmitting apparatus side passive electrode, the power receiving apparatus comprising:
   a power receiving apparatus side active electrode;
   a power receiving apparatus side passive electrode;
   a voltage step-down circuit that decreases a voltage generated between the power receiving apparatus side active electrode and the power receiving apparatus side passive electrode; and
   a load circuit that receives an output voltage of the voltage step-down circuit as a power supply voltage,
   wherein the power receiving apparatus side active electrode is connected to the power transmitting apparatus side active electrode through capacitance, and the power receiving apparatus side passive electrode is directly electrically connected to the power transmitting apparatus side passive electrode.

2. The power receiving apparatus according to claim 1, wherein the power receiving apparatus side passive electrode forms a casing of the power receiving apparatus.

3. The power receiving apparatus according to claim 1, wherein the power transmitting apparatus includes:
   a mounting surface formed of a first surface and a second surface substantially perpendicular to each other;
   the power transmitting apparatus side active electrode provided along the first surface;
   the power transmitting apparatus side passive electrode provided on the second surface; and
   the high-frequency high-voltage generator circuit that applies a high-frequency high voltage between the power transmitting apparatus side active electrode and the power transmitting apparatus side passive electrode,
   wherein the power receiving apparatus includes:
   a casing having a bottom surface and a back surface substantially perpendicular to each other, and two substantially parallel side surfaces substantially perpendicular to the bottom surface and the back surface;
   the power receiving apparatus side active electrode being provided along the back surface of the casing and facing the power transmitting apparatus side active electrode;
   the power receiving apparatus side passive electrode being provided on the bottom surface and at least one of the two side surfaces and directly electrically connected to the power transmitting apparatus side passive electrode.

4. A power transmitting apparatus forming a pair with a power receiving apparatus in which a voltage step-down circuit is connected between a power receiving apparatus side active electrode and a power receiving apparatus side passive electrode, the power transmitting apparatus comprising:
   a power transmitting apparatus side active electrode that faces the power receiving apparatus side active electrode;
   a power transmitting apparatus side passive electrode that faces the power receiving apparatus side passive electrode; and
   a high-frequency high-voltage generator circuit connected between the power transmitting apparatus side active electrode and the power transmitting apparatus side passive electrode,
   wherein the power transmitting apparatus side active electrode is connected to the power receiving apparatus side active electrode through capacitance, and the power transmitting side active electrode is directly electrically connected to the power receiving apparatus side passive electrode.

5. The power transmitting apparatus according to claim 4, wherein the power transmitting apparatus side passive electrode is connected to a ground of the power transmitting apparatus.

6. The power transmitting apparatus according to claim 5, wherein the ground of the power transmitting apparatus is connected to a reference potential of an input power supply system of the power transmitting apparatus through a low impedance for a direct current or an alternating current.

7. A power transmission system comprising:
   a power transmitting apparatus including:
      a power transmitting apparatus side active electrode;
      a power transmitting apparatus side passive electrode; and
      a high-frequency high-voltage generator circuit connected between the power transmitting apparatus side active electrode and the power transmitting apparatus side passive electrode; and
   a power receiving apparatus including:
      a power receiving apparatus side active electrode;
      a power receiving apparatus side passive electrode;
      a voltage step-down circuit that decreases a voltage generated between the power receiving apparatus side active electrode and the power receiving apparatus side passive electrode; and
      a load circuit that receives an output voltage of the voltage step-down circuit as a power supply voltage;
   wherein the power transmitting apparatus side active electrode is connected to the power receiving apparatus side active electrode through capacitance generated between the power transmitting apparatus side active electrode and the power receiving apparatus side active electrode, and the power transmitting apparatus side passive electrode is directly electrically connected to the power receiving apparatus side passive electrode,
   wherein the power transmitting apparatus includes a mounting surface formed of first and second surfaces substantially perpendicular to each other,
   wherein the power receiving apparatus includes a third surface in contact with the first surface of the power transmitting apparatus and a fourth surface in contact with the second surface of the power transmitting apparatus,
   wherein the power transmitting apparatus side passive electrode is provided on the first surface, and the power transmitting apparatus side active electrode is provided along the second surface, and
   wherein the power receiving apparatus side passive electrode is provided on the third surface, and the power receiving apparatus side active electrode is provided along the fourth surface.

8. The power transmission system according to claim 7, wherein the power receiving apparatus further includes fifth and sixth substantially parallel surfaces substantially perpendicular to the third and fourth surfaces, and wherein the power receiving apparatus side passive electrode is also provided on at least one of the fifth and sixth surfaces.

9. The power transmission system according to claim 7, wherein the power transmitting apparatus side passive electrode is formed of two electrodes provided in such a manner as to be separated from each other, and wherein the power transmitting apparatus includes a detecting unit that detects, via the power receiving apparatus side passive electrode, whether or not there is electrical connection between one and the other of the power transmitting apparatus side passive electrode.

10. The power transmission system according to claim 9, wherein the two electrodes are each substantially strip-shaped and are arranged substantially in parallel with each other along a longitudinal direction.

11. The power transmission system according to claim 9, wherein the two electrodes are each substantially strip-shaped and are arranged in a substantially straight line in such a manner as to have the same longitudinal direction.

12. The power transmission system according to claim 9, wherein the two electrodes are first and second substantially comb-shaped electrodes arranged such that respective electrode fingers of the first and second substantially comb-shaped electrodes are alternately arranged parallel to one another.

13. The power transmission system according to claim 7, wherein the power receiving apparatus side active electrode has a larger area then the power transmitting apparatus side active electrode.

14. The power transmission system according to claim 7, wherein the power transmitting apparatus side passive electrode is connected to a ground of the power transmitting apparatus.

15. The power transmission system according to claim 7, wherein the power transmitting apparatus includes a power transmitting apparatus side communication electrode on a surface on which the power transmitting apparatus side passive electrode is formed, and the power receiving apparatus includes a power receiving apparatus side communication electrode in contact with the power transmitting apparatus side communication electrode on a surface on which the power receiving apparatus side passive electrode is formed.

16. A power transmission system comprising:
a power transmitting apparatus including:
　a power transmitting apparatus side active electrode;
　a power transmitting apparatus side passive electrode; and
　a high-frequency high-voltage generator circuit connected between the power transmitting apparatus side active electrode and the power transmitting apparatus side passive electrode; and
a power receiving apparatus including:
　a power receiving apparatus side active electrode;
　a power receiving apparatus side passive electrode;
　a voltage step-down circuit that decreases a voltage generated between the power receiving apparatus side active electrode and the power receiving apparatus side passive electrode; and
　a load circuit that receives an output voltage of the voltage step-down circuit as a power supply voltage;
wherein the power transmitting apparatus side active electrode is connected to the power receiving apparatus side active electrode through capacitance generated between the power transmitting apparatus side active electrode and the power receiving apparatus side active electrode, and the power transmitting apparatus side passive electrode is directly electrically connected to the power receiving apparatus side passive electrode,
wherein the power transmitting apparatus includes a mounting surface for mounting the power receiving apparatus,
wherein the power transmitting apparatus side passive electrode is provided on the mounting surface of the power transmitting apparatus, and the power transmitting apparatus side active electrode is provided along the mounting surface, and
wherein the power receiving apparatus side passive electrode is provided on the bottom surface of the power receiving apparatus and the power receiving apparatus side active electrode is provided along the bottom surface of the power receiving apparatus.

17. The power transmission system according to claim 16, wherein the power receiving apparatus side active electrode has a larger area then the power transmitting apparatus side active electrode.

18. The power transmission system according to claim 16, wherein the power transmitting apparatus side passive electrode is connected to a ground of the power transmitting apparatus.

19. The power transmission system according to claim 16, wherein the power transmitting apparatus includes a power transmitting apparatus side communication electrode on a surface on which the power transmitting apparatus side passive electrode is formed, and the power receiving apparatus includes a power receiving apparatus side communication electrode in contact with the power transmitting apparatus side communication electrode on a surface on which the power receiving apparatus side passive electrode is formed.

20. The power transmission system according to claim 16, wherein the power transmitting apparatus side passive electrode is formed of two electrodes provided in such a manner as to be separated from each other, and wherein the power transmitting apparatus includes a detecting unit that detects, via the power receiving apparatus side passive electrode, whether or not there is electrical connection between one and the other of the power transmitting apparatus side passive electrode.

21. The power transmission system according to claim 20, wherein the two electrodes are each substantially strip-shaped and are arranged substantially in parallel with each other along a longitudinal direction.

22. The power transmission system according to claim 20, wherein the two electrodes are each substantially strip-shaped and are arranged in a substantially straight line in such a manner as to have the same longitudinal direction.

23. The power transmission system according to claim 20, wherein the two electrodes are first and second substantially comb-shaped electrodes arranged such that respective electrode fingers of the first and second substantially comb-shaped electrodes are alternately arranged parallel to one another.

\* \* \* \* \*